(12) United States Patent
Powell et al.

(10) Patent No.: US 9,102,878 B2
(45) Date of Patent: *Aug. 11, 2015

(54) PROCESS TO PRODUCE BIOFUELS FROM BIOMASS

(75) Inventors: Joseph Broun Powell, Houston, TX (US); Juben Nemchand Chheda, Houston, TX (US)

(73) Assignee: Shell Oil Company, Houston, TX (US)

(*) Notice: Subject to any disclaimer, the term of this patent is extended or adjusted under 35 U.S.C. 154(b) by 782 days.

This patent is subject to a terminal disclaimer.

(21) Appl. No.: 13/330,775

(22) Filed: Dec. 20, 2011

(65) Prior Publication Data

US 2012/0151826 A1    Jun. 21, 2012

Related U.S. Application Data

(60) Provisional application No. 61/424,788, filed on Dec. 20, 2010.

(51) Int. Cl.
*C07C 1/00* (2006.01)
*C10G 1/00* (2006.01)

(52) U.S. Cl.
CPC .......... *C10G 1/00* (2013.01); *C10G 2300/1011* (2013.01); *C10G 2300/1014* (2013.01); *C10G 2300/202* (2013.01); *C10G 2300/4081* (2013.01); *C10G 2300/44* (2013.01); *Y02E 50/343* (2013.01); *Y02T 50/678* (2013.01)

(58) Field of Classification Search
CPC ........................................................ C10G 3/10
USPC ............. 585/240, 242; 44/307, 605; 435/166; 127/37
See application file for complete search history.

(56) References Cited

U.S. PATENT DOCUMENTS

| | | |
|---|---|---|
| 3,105,095 A | 9/1963 | Oshima et al. |
| 6,100,385 A | 8/2000 | Naac et al. |
| 6,207,808 B1 | 3/2001 | Naac et al. |

(Continued)

FOREIGN PATENT DOCUMENTS

| | | |
|---|---|---|
| CN | 101012387 | 8/2007 |
| CN | 101285106 | 10/2008 |

(Continued)

OTHER PUBLICATIONS

Huber, G.W. et al., "Production of Liquid Alkanes by Aqueous-Phase Processing of Biomass Derived Carbohydrates", vol. 308, Jun. 2005, pp. 1446-1450.

(Continued)

*Primary Examiner* — Nina Bhat

(57) ABSTRACT

Processes to produce biofuels from biomass is provided where the biomass is contacted with an aqueous media to form a extracted biomass and at least a portion of an aqueous liquor separated from the extracted biomass containing soluble carbohydrate is treated with a purification substrate to form a treated carbohydrate stream having less than 35% of the sulfur content and less than 35% of the nitrogen content, based on the untreated aqueous liquor stream prior to contact with a hydrogenolysis catalyst to form a plurality of oxygenated intermediates that can be further processed to form a liquid fuel. An extracted biomass solids stream is also separated from the extracted biomass which is contacted with a first digestive solvent to form a pretreated biomass and then a second digestive solvent to form a solubilized pulp comprising soluble carbohydrates.

20 Claims, 2 Drawing Sheets

(56) References Cited

U.S. PATENT DOCUMENTS

| | | | |
|---|---|---|---|
| 6,299,774 B1 | 10/2001 | Ainsworth et al. | |
| 6,663,777 B2 | 12/2003 | Schimel | |
| 8,692,041 B2* | 4/2014 | Powell et al. | 585/240 |
| 8,846,993 B2* | 9/2014 | Powell | 585/240 |
| 2002/0079266 A1 | 6/2002 | Ainsworth et al. | |
| 2004/0237854 A1 | 12/2004 | Piretti | |
| 2008/0312346 A1 | 12/2008 | McCall et al. | |
| 2011/0154721 A1 | 6/2011 | Chheda et al. | 44/307 |
| 2011/0282115 A1 | 11/2011 | Chheda et al. | 585/240 |

FOREIGN PATENT DOCUMENTS

| | | |
|---|---|---|
| CN | 101522760 | 9/2009 |
| TW | 200916568 A | 4/2009 |
| WO | 2010/025241 A2 | 3/2010 |

OTHER PUBLICATIONS

Huber, G.W. et al., "Renewable Alkanes by Aqueous Phase Reforming of Biomass Derived Oxygenates", Angew. Chem. Int. Ed., vol. 43, Dec. 2004, pp. 1549-1551.

Lange, Jean-Paul et al: Valeric Biofuels: A Platform of Cellulosic Transporation Fuels, Angew. Chem. Int. Ed., vol. 49, May 5, 2010, pp. 4479-4483.

Li, Ning et al., "Renewable Gasoline from Aqueous Phase Hydrodeoxygenation of Aqueous Sugar Solutions Prepared by Hydrolysis of Maple Wood", Green Chem, vol. 13, Nov. 2010, pp. 91-101.

Murata, K. et al., Hydrocracking of Biomass Derived Materials Into Alkanes in the Presence of Platinum-based Catalyst and Hydrogen, Catal. Lett., vol. 140, Aug. 2010.

Serrano-Ruiz, J. C. et al., "Conversion of Cellulose to Hydrocarbon Fuels by Progressive Removal of Oxygen", Applied Catalysis B: Environmental, vol. 100, Aug. 2010, pp. 184-189.

PCT International Searching Authority report mailed Jun. 20, 2012, Application No. PCT/US2011/066092 filed Dec. 20, 2011.

Search Report of State Intellectual Property Office of the People's Republic of China, date of notification Jul. 23, 2014, corresponding Chinese Application No. 201180065607.2.

* cited by examiner

PROCESS TO PRODUCE BIOFUELS FROM BIOMASS

The present application claims the benefit of U.S. Provisional Patent Application Ser. No. 61/424,788 filed Dec. 20, 2010, the entire disclosure of which is hereby incorporated by reference.

FIELD OF THE INVENTION

The invention relates to the production of higher hydrocarbons suitable for use in transportation fuels and industrial chemicals from biomass.

BACKGROUND OF THE INVENTION

A significant amount of attention has been placed on developing new technologies for providing energy from resources other than fossil fuels. Biomass is a resource that shows promise as a fossil fuel alternative. As opposed to fossil fuel, biomass is also renewable.

Biomass may be useful as a source of renewable fuels. One type of biomass is plant biomass. Plant biomass is the most abundant source of carbohydrate in the world due to the lignocellulosic materials composing the cell walls in higher plants. Plant cell walls are divided into two sections, primary cell walls and secondary cell walls. The primary cell wall provides structure for expanding cells and is composed of three major polysaccharides (cellulose, pectin, and hemicellulose) and one group of glycoproteins. The secondary cell wall, which is produced after the cell has finished growing, also contains polysaccharides and is strengthened through polymeric lignin covalently cross-linked to hemicellulose. Hemicellulose and pectin are typically found in abundance, but cellulose is the predominant polysaccharide and the most abundant source of carbohydrates. However, production of fuel from cellulose poses a difficult technical problem. Some of the factors for this difficulty are the physical density of lignocelluloses (like wood) that can make penetration of the biomass structure of lignocelluloses with chemicals difficult and the chemical complexity of lignocelluloses that lead to difficulty in breaking down the long chain polymeric structure of cellulose into carbohydrates that can be used to produce fuel.

Most transportation vehicles require high power density provided by internal combustion and/or propulsion engines. These engines require clean burning fuels which are generally in liquid form or, to a lesser extent, compressed gases. Liquid fuels are more portable due to their high energy density and their ability to be pumped, which makes handling easier.

Currently, bio-based feedstocks such as biomass provide the only renewable alternative for liquid transportation fuel. Unfortunately, the progress in developing new technologies for producing liquid biofuels has been slow in developing, especially for liquid fuel products that fit within the current infrastructure. Although a variety of fuels can be produced from biomass resources, such as ethanol, methanol, and vegetable oil, and gaseous fuels, such as hydrogen and methane, these fuels require either new distribution technologies and/or combustion technologies appropriate for their characteristics. The production of some of these fuels also tends to be expensive and raise questions with respect to their net carbon savings. There is a need to directly process biomass into liquid fuels.

SUMMARY OF THE INVENTION

In an embodiment, a method comprises: (i) providing a biomass containing celluloses, hemicelluloses and lignin; (ii) contacting the biomass with an aqueous media to form a extracted biomass comprising celluloses, hemicelluloses, soluble carbohydrates and lignin; (iii) separating at least a portion of an aqueous liquor from the extracted biomass thereby providing the aqueous liquor stream comprising soluble carbohydrates and an extracted biomass solids stream comprising celluloses, hemicelluloses, and lignin; (iv) contacting said extracted biomass solids stream with a first digestive solvent to form a pretreated biomass comprising celluloses and residual hemicelluloses; (v) contacting said pretreated biomass with a second digestive solvent to form a solubilized pulp comprising soluble carbohydrates; (vi) contacting the aqueous liquor stream with a purification substrate effective to remove sulfur compounds and nitrogen compounds thereby producing a treated carbohydrate stream having less than 35% of the sulfur content and less than 35% of the nitrogen content, based on the untreated aqueous liquor stream; (vii) contacting the treated carbohydrate stream and the solubilized pulp stream directly with hydrogen in the presence of a hydrogenolysis catalyst to form a plurality of oxygenated intermediates wherein the a first portion of the oxygenated intermediates are recycled to form the second digestive solvent; and (viii) processing at least a second portion of the oxygenated intermediates to form a liquid fuel.

In another embodiment, a method comprises: (i) providing a biomass containing celluloses, hemicelluloses and lignin; (ii) contacting the biomass with an aqueous media to form a extracted biomass comprising celluloses, hemicelluloses, soluble carbohydrates and lignin; (iii) separating at least a portion of an aqueous liquor from the extracted biomass thereby providing the aqueous liquor stream comprising soluble carbohydrates, and a extracted biomass solids stream comprising celluloses, hemicelluloses, and lignin; (iv) contacting said extracted biomass solids stream with a first digestive solvent to form a pretreated biomass comprising celluloses, and residual hemicelluloses and; (v) contacting said pretreated biomass with a second digestive solvent to form a solubilized pulp comprising soluble carbohydrates wherein at least a portion of the solubilized pulp is provided to the aqueous liquor stream; (vi) contacting the aqueous liquor stream with a purification substrate effective to remove sulfur compounds and nitrogen compounds thereby producing a treated carbohydrate stream having less than 35% of the sulfur content and less than 35% of the nitrogen content, based on untreated aqueous liquor stream thereby producing a treated aqueous liquor carbohydrate stream; (vii) contacting the treated aqueous liquor carbohydrate stream directly with hydrogen in the presence of a hydrogenolysis catalyst to form a plurality of oxygenated intermediates wherein the a first portion of the oxygenated intermediates are recycled to form the second digestive solvent; and (viii) processing at least a second portion of the oxygenated intermediates to form a liquid fuel.

In another embodiment, a method comprises: (i) providing a biomass containing celluloses, hemicelluloses and lignin; (ii) contacting the biomass with an aqueous media to form a extracted biomass comprising celluloses, hemicelluloses, soluble carbohydrates and lignin; (iii) separating at least a portion of an aqueous liquor from the extracted biomass thereby providing the aqueous liquor stream comprising soluble carbohydrates, and a extracted biomass solids stream comprising celluloses, hemicelluloses, and lignin; (iv) contacting said extracted biomass solids stream with a first digestive solvent to form a pretreated biomass comprising celluloses, and residual hemicelluloses and; (v) contacting said pretreated biomass with a second digestive solvent to form a solubilized pulp comprising soluble carbohydrates wherein at least a portion of the solubilized pulp is provided to the aqueous media; (vi) contacting the aqueous liquor stream with a purification substrate effective to remove sulfur compounds and nitrogen compounds thereby producing a treated carbohydrate stream having less than 35% of the sulfur content and less than 35% of the nitrogen content, based on untreated aqueous liquor stream thereby producing a treated aqueous liquor carbohydrate stream; (vii) contacting the treated aqueous liquor carbohydrate stream directly with hydrogen in the presence of a hydrogenolysis catalyst to form a plurality of oxygenated intermediates wherein the a first portion of the oxygenated intermediates are recycled to form the second digestive solvent; and (viii) processing at least a second portion of the oxygenated intermediates to form a liquid fuel.

In yet another embodiment, a system comprises: a vessel that receives a biomass feedstock and an aqueous media operating under conditions effective to produce a extracted biomass comprising celluloses, hemicelluloses, soluble carbohydrates and lignin and discharges an aqueous liquor stream comprising soluble carbohydrates; a digester that receives the extracted biomass and a first digestive solvent operating under conditions effective to produce a pretreated biomass comprising celluloses, and residual hemicelluloses and lignin; a vessel that receives the pretreated biomass and a second digestive solvent operating under conditions effective to produce a solubilized pulp comprising soluble carbohydrates; an aqueous liquor treater comprising a purification substrate that receives the aqueous liquor and discharges a treated carbohydrate stream having less than 35% of the sulfur content and less than 35% of the nitrogen content, based on the untreated aqueous liquor stream; a hydrogenolysis reactor comprising a hydrogenolysis catalyst that receives hydrogen and the treated carbohydrate stream and the solubilized pulp and discharges an oxygenated intermediate stream, wherein a first portion of the oxygenated intermediate stream is recycled as the second digestive solvent to the vessel that receives the pretreated biomass to form the solubilized pulp; a first fuels processing reactor comprising a dehydrogenation catalyst that receives a second portion of the oxygenated intermediate stream and discharges an olefin-containing stream; and a second fuels processing reactor comprising an alkylation catalyst that receives the olefin-containing stream and discharges a liquid fuel.

In yet another embodiment, a system comprises: a vessel that receives a biomass feedstock and an aqueous media operating under conditions effective to produce a extracted biomass comprising celluloses, hemicelluloses, soluble carbohydrates and lignin and discharges an aqueous liquor stream comprising soluble carbohydrates; a digester that receives the extracted biomass and a first digestive solvent operating under conditions effective to produce a pretreated biomass comprising celluloses, residual hemicelluloses and lignin; a vessel that receives the pretreated biomass and a second digestive solvent operating under conditions effective to produce a solubilized pulp comprising soluble carbohydrates; an aqueous liquor treater comprising a purification substrate that receives the aqueous liquor and the solubilized pulp and discharges a treated carbohydrate stream having less than 35% of the sulfur content and less than 35% of the nitrogen content based on the untreated aqueous liquor stream; a hydrogenolysis reactor comprising a hydrogenolysis catalyst that receives hydrogen and the treated carbohydrate stream and discharges an oxygenated intermediate stream, wherein a first portion of the oxygenated intermediate stream is recycled to the vessel that receives the pretreated biomass to form the solubilized pulp; and a fuels processing reactor comprising a condensation catalyst that receives a second portion of the oxygenated intermediate stream and discharges a liquid fuel.

In yet another embodiment, a system comprises: a vessel that receives a biomass feedstock and an aqueous media operating under conditions effective to produce a extracted biomass comprising celluloses, hemicelluloses, soluble carbohydrates and lignin and discharges an aqueous liquor stream comprising soluble carbohydrates; a digester that receives the extracted biomass and a first digestive solvent operating under conditions effective to produce a pretreated biomass comprising celluloses, residual hemicelluloses and lignin; a vessel that receives the pretreated biomass and a second digestive solvent operating under conditions effective to produce a solubilized pulp comprising soluble carbohydrates; an aqueous liquor treater comprising a purification substrate that receives the aqueous liquor and discharges a treated aqueous liquor carbohydrate stream having less than 35% of the sulfur content and less than 35% of the nitrogen content based on the untreated aqueous liquor stream; a hydrogenolysis reactor comprising a hydrogenolysis catalyst that receives hydrogen and the treated aqueous liquor carbohydrate stream and discharges an oxygenated intermediate stream, wherein a first portion of the oxygenated intermediate stream is recycled as the second digestive solvent to the vessel that receives the pretreated biomass to form the solubilized pulp; and at least a portion of the solubilized pulp is recycled to the vessel that receives the biomass feedstock to comprise at least a portion of the aqueous media, and a fuels processing reactor comprising a condensation catalyst that receives a second portion of the oxygenated intermediate stream and discharges a liquid fuel.

In yet another embodiment, a system comprises: a vessel that receives a biomass feedstock and an aqueous media operating under conditions effective to produce a extracted biomass comprising celluloses, hemicelluloses, soluble carbohydrates and lignin and discharges an aqueous liquor stream comprising soluble carbohydrates; a digester that receives the extracted biomass and a first digestive solvent operating under conditions effective to produce a pretreated biomass comprising celluloses, residual hemicelluloses and lignin; a vessel that receives the pretreated biomass and a second digestive solvent operating under conditions effective to produce a solubilized pulp comprising soluble carbohydrates; an aqueous liquor treater comprising a purification substrate that receives the aqueous liquor and discharges a treated aqueous liquor carbohydrate stream having less than 35% of the sulfur content and less than 35% of the nitrogen content based on the untreated aqueous liquor stream; a hydrogenolysis reactor comprising a hydrogenolysis catalyst that receives hydrogen and the treated aqueous liquor carbohydrate stream and discharges an oxygenated intermediate stream, wherein a first portion of the oxygenated intermediate stream is recycled as the second digestive solvent to the vessel that receives the pretreated biomass to form the solubilized pulp; and at least a portion of the solubilized pulp is recycled to the vessel that receives the biomass feedstock to comprise at least a portion of the aqueous media; a first fuels processing reactor comprising a dehydrogenation catalyst that receives a second portion of the oxygenated intermediate stream and discharges an olefin-containing stream; and a second fuels processing reactor comprising an alkylation catalyst that receives the olefin-containing stream and discharges a liquid fuel.

The features and advantages of the invention will be apparent to those skilled in the art. While numerous changes may be made by those skilled in the art, such changes are within the spirit of the invention.

BRIEF DESCRIPTION OF THE DRAWING

These drawings illustrate certain aspects of some of the embodiments of the invention, and should not be used to limit or define the invention.

DETAILED DESCRIPTION OF THE INVENTION

Figure 1:
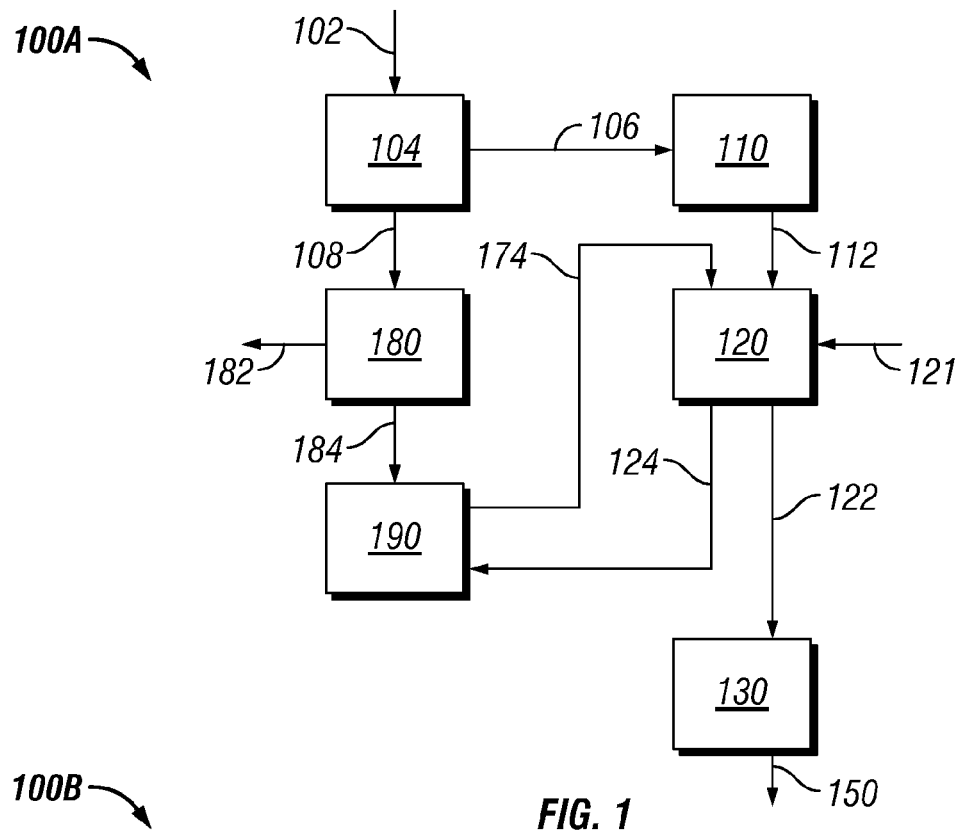
FIG. 1 schematically illustrates a block flow diagram of an embodiment of a higher hydrocarbon production process of this invention, where the solubilized pulp is sent directly to the hydrogenolysis system.

The invention relates to the production of higher hydrocarbons suitable for use in transportation fuels and industrial chemicals from biomass. The higher hydrocarbons produced are useful in forming transportation fuels, such as synthetic gasoline, diesel fuel, and jet fuel, as well as industrial chemicals. As used herein, the term "higher hydrocarbons" refers to hydrocarbons having an oxygen to carbon ratio less than the oxygen to carbon ratio of at least one component of the biomass feedstock. As used herein the term "hydrocarbon" refers to an organic compound comprising primarily hydrogen and carbon atoms, which is also an unsubstituted hydrocarbon. In certain embodiments, the hydrocarbons of the invention also comprise heteroatoms (e.g., oxygen or sulfur) and thus the term "hydrocarbon" may also include substituted hydrocarbons. The term "soluble carbohydrates" refers to oligosaccharides and monosaccharides that are soluble in the digestive solvent and that can be used feedstock to the hydrogenolysis reaction (e.g., pentoses and hexoses).

The methods and systems of the invention have an advantage of pretreating a raw biomass feedstock with an aqueous media to produce soluble carbohydrates that are further treated to remove substantial amount of nitrogen compounds and sulfur compounds and optionally phosphorus compounds contained in the biomass that tend to poison the catalysts prior to hydrogenolysis processing. Further the pretreated residual biomass is further digested with a first digestive solvent then a second digestive solvent to produce additional soluble carbohydrates for the hydrogenolysis processing. The soluble carbohydrates is then converted by hydrogenolysis reactions to form an oxygenated intermediate stream comprising polyols, alcohols, ketones, aldehydes, and other oxygenated reaction products that can be fed directly to a processing reaction to form higher hydrocarbons, which results in an increased conversion and conversion efficiency by minimizing catalyst poisoning and extend the catalyst life. At least a portion of oxygenated intermediates produced in the hydrogenolysis reaction are recycled within the process and system to at least in part form the in situ generated solvent to form the second digestive solvent. This recycle saves costs and can increase the amount of carbohydrates extracted from the biomass feedstock, particularly when configured in a counter current mode. Further, by controlling the degradation of carbohydrates in the hydrogenolysis process, the hydrogenation reaction can be conducted along with the hydrogenolysis reaction at temperatures ranging from 200° C. to about 275° C. As a result, a separate hydrogenation reaction can be avoided and the fuel forming potential of the biomass feedstock fed to the process can be increased. This process and reaction scheme described herein also results in a capital cost savings and process operational cost savings. Advantages of specific embodiments will be described in more detail below.

In reference to FIG. 1, in one embodiment of the invention process 100A, biomass 102 is provided to extraction system 104 whereby the biomass is contacted with an aqueous media to form a extracted biomass that can be separated to an aqueous liquor stream 106 containing at least a portion of the soluble carbohydrates, nitrogen compounds and sulfur compounds and an extracted biomass solids stream 108 comprising celluloses, hemicelluloses, and lignin. At least a portion of the extracted biomass solids stream 108 is provided to the first digestive system 180 whereby the extracted biomass solids stream is contacted with a first digestive solvent to form a pretreated biomass 184 comprising celluloses, residual hemicelluloses and lignin 182. The pretreated biomass 184 is provided to the second digestive system 190 whereby the pretreated biomass 184 is contacted with a second digestive solvent to form a solubilized pulp 174 comprising soluble carbohydrates. The aqueous liquor 106 from the extracted biomass is provided to treatment system 110 where the aqueous liquor is contacted with the purification substrate to produce a treated carbohydrate stream 112 containing soluble carbohydrates having less than 35% of the sulfur content, preferably less than 10% of the sulfur content, and less than 35% nitrogen content, preferably less than 10% of nitrogen content based on the untreated aqueous liquor stream. At least a portion of the treated carbohydrate stream 112 and at least a portion of the solubilized pulp 174 is fed to a hydrogenolysis system 120 containing a hydrogenolysis catalyst whereby the treated carbohydrate stream and solubilized pulp are catalytically reacted with hydrogen 121 in the presence of a hydrogenolysis catalyst to produce a plurality of oxygenated intermediates 122, and at least a first portion of the oxygenated intermediates is provided to processing system 130 to produce higher hydrocarbons to form a liquid fuel 150 and second portion of the oxygenated intermediate is recycled 124 to form the second digestive solvent for second digestive system 190.

Figure 2:
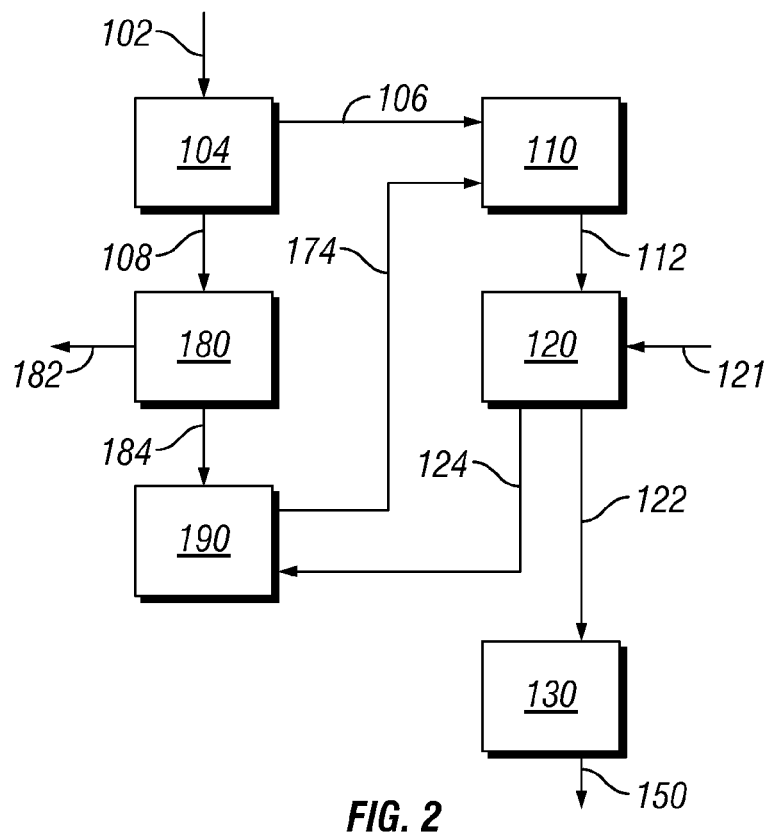
FIG. 2 schematically illustrates a block flow diagram of an embodiment of a higher hydrocarbon production process of this invention, where the solubilized pulp is sent first to a treater containing purification substrate, before feeding to the hydrogenolysis system.

In reference to FIG. 2, in one embodiment of the invention process 100B, biomass 102 is provided to extraction system 104 whereby the biomass is contacted with an aqueous media to form a extracted biomass that can be separated to an aqueous liquor stream 106 containing at least a portion of the soluble carbohydrates, nitrogen compounds and sulfur compounds and a extracted biomass solids stream 108 comprising celluloses, hemicelluloses, and lignin. The extracted biomass solids stream 108 is provided to the first digestive system 180 whereby the pretreated biomass solids stream is contacted with a first digestive solvent to form a pretreated biomass 184 comprising celluloses, and residual hemicelluloses and lignin 182. The pretreated biomass 184 is provided to the second digestive system 190 whereby the pretreated biomass 184 is contacted with a second digestive solvent to form a solubilized pulp 174 comprising soluble carbohydrates. The aqueous liquor 106 from the extracted biomass and the solubilized pulp 174 is provided to treatment system 110 where the combined aqueous liquor and solubilized pulp are contacted with the purification substrate to produce a treated carbohydrate stream 112 containing soluble carbohydrates having less than 35% of the sulfur content, preferably less than 10% of the sulfur content, and less than 35% nitrogen content, preferably less than 10% of nitrogen content based on the untreated aqueous liquor stream. At least a portion of the treated carbohydrate stream 112 is fed to a hydrogenolysis system 120 containing a hydrogenolysis catalyst whereby the treated carbohydrate stream is catalytically reacted with hydrogen 121 in the presence of a hydrogenolysis catalyst to produce a plurality of oxygenated intermediates 122, and at least a first portion of the oxygenated intermediates is provided to processing system 130 to produce higher hydrocarbons to form a liquid fuel 150 and second portion of the oxygenated intermediate is recycled 124 to form the second digestive solvent for second digestive system 190.

Figure 3:
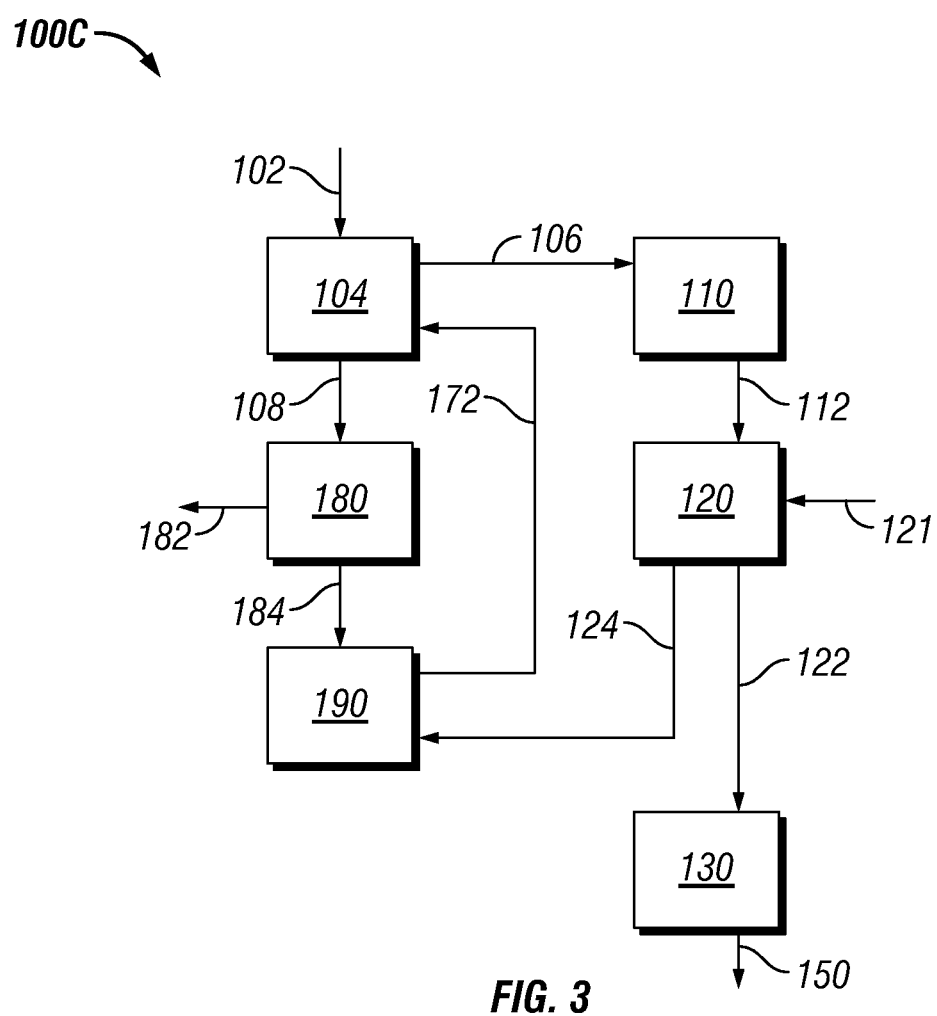
FIG. 3 schematically illustrates a block flow diagram of an embodiment of a higher hydrocarbon production process of the invention, where the solubilized pulp is sent first to the biomass partial-extraction zone, to form at least in part the aqueous liquor.

In reference to FIG. 3, in one embodiment of the invention process 100C, biomass 102 is provided to extraction system 104 whereby the biomass is contacted with an aqueous media to form a extracted biomass that can be separated to an aqueous liquor stream 106 containing at least a portion of the soluble carbohydrates, nitrogen compounds and sulfur compounds and a extracted biomass solids stream 108 comprising celluloses, hemicelluloses, and lignin. The extracted biomass solids stream 108 is provided to the first digestive system 180 whereby the extracted biomass solids stream is contacted with a first digestive solvent to form a pretreated biomass 184 comprising celluloses, and residual hemicelluloses and lignin 182. The pretreated biomass 184 is provided to the second digestive system 190 whereby the pretreated biomass 184 is contacted with a second digestive solvent counter-currently to form a solubilized pulp 172 comprising soluble carbohydrates which is provided to the extraction system 104, then to 110 as the aqueous liquor stream 106. The aqueous liquor from the extracted biomass 106 containing the solubilized pulp in 172 is provided to treatment system 110 where the aqueous liquor is contacted with the purification substrate to produce a treated carbohydrate stream 112 containing soluble carbohydrates having less than 35% of the sulfur content, preferably less than 10% of the sulfur content, and less than 35% based on the nitrogen content, preferably less than 10% of the nitrogen content of the untreated aqueous liquor stream. At least a portion of the treated carbohydrate stream 112 is fed to a hydrogenolysis system 120 containing a hydrogenolysis catalyst whereby the treated carbohydrate stream is catalytically reacted with hydrogen 121 in the presence of a hydrogenolysis catalyst to produce a plurality of oxygenated intermediates 122, and at least a first portion of the oxygenated intermediates is provided to processing system 130 to produce higher hydrocarbons to form a liquid fuel 150 and second portion of the oxygenated intermediate is recycled 124 to form the second digestive solvent for second digestive system 190.

Any suitable (e.g., inexpensive and/or readily available) type of biomass can be used. Suitable lignocellulosic biomass can be, for example, selected from, but not limited to, forestry residues, agricultural residues, herbaceous material, municipal solid wastes, waste and recycled paper, pulp and paper mill residues, and combinations thereof. Thus, in some embodiments, the biomass can comprise, for example, corn stover, straw, bagasse, miscanthus, sorghum residue, switch grass, bamboo, water hyacinth, hardwood, hardwood chips, hardwood pulp, softwood, softwood chips, softwood pulp, and/or combination of these feedstocks. The biomass can be chosen based upon a consideration such as, but not limited to, cellulose and/or hemicelluloses content, lignin content, growing time/season, growing location/transportation cost, growing costs, harvesting costs and the like.

Prior to the pretreatment with the aqueous media, the biomass can be washed and/or reduced in size (e.g., chopping, crushing or debarking) to a convenient size and certain quality that aids in moving the biomass or mixing and impregnating the chemicals from digestive solvent. Thus, in some embodiments, providing biomass can comprise harvesting a lignocelluloses-containing plant such as, for example, a hardwood or softwood tree. The tree can be subjected to debarking, chopping to wood chips of desirable thickness, and washing to remove any residual soil, dirt and the like.

In the extraction system, the size-reduced biomass is contacted with the aqueous media in at least one vessel where the pretreatment takes place. The aqueous media must be effective to produce at least some soluble carbohydrate. The amount of soluble carbohydrate formation may vary depending on the aqueous media and temperature and time of contact with the biomass. The pretreated biomass can be separated to an aqueous liquor stream containing at least a portion of the soluble carbohydrates, nitrogen compounds and sulfur compounds and an extracted biomass solids stream containing celluloses, hemicelluloses, and lignin by conventional separation methods.

In one aspect of the embodiment, the aqueous media may be (i) water that may optionally containing (ii) water soluble organic solvents such as, for example, alcohols having a carbon number of 1 to 6 such as methanol, ethanol, and propanol, and branched alcohols such as 2-methyl pentanol; diols having a carbon number less than 6 such as ethylene glycol and 1,2-propylene glycol, ketones having a carbon number of 1 to 5 such as acetone, and methyl ethyl ketone, and aldehydes having a carbon number of 1 to 5 such as formaldehyde, acetaldehyde, propanal, butanal; acids having a carbon number of 1 to 6 such as formic acid, acetic acid, propionic acid, butyric acid and any mixtures thereof. Cyclic ethers such as tetrahydrofuran, methyl tetrahydrofurans may be present. The water soluble organic solvent may be present in the aqueous media in an amount of 0.1%, more preferably at least 2%, to 10 wt %, more preferably to about 50%, based on the aqueous media. The aqueous media to biomass ratio can be within the range of 1 to 20, preferably 3 to 5. The pretreatment reaction can be carried out at a temperature within the range of about 60° C. to 240° C., most preferably within a range of about 110° C. to about 210° C. and a residence time within about 0.5 h to 5 h. The reaction is carried out under conditions effective to provide an aqueous liquor containing soluble carbohydrate content of at least 1% by weight.

In the first digestion system, at least a portion of the extracted biomass solids stream is contacted with a first digestive solvent in at least one digester where the digestion reaction takes place. The first digestive solvent must be effective to digest lignins to effect removal of at least a portion of the lignin and remaining nitrogen, and sulfur compounds from the biomass.

In one aspect of the embodiment, the first digestive solvent maybe a Kraft-like digestive solvent that contains (i) at least 0.5 wt %, more preferably at least 4 wt %, to at most 20 wt %, more preferably to 10 wt %, based on the digestive solvent, of at least one alkali selected from the group consisting of sodium hydroxide, sodium carbonate, sodium sulfide, potassium hydroxide, potassium carbonate, ammonium hydroxide, and mixtures thereof, (ii) optionally, 0 to 3 wt %, based on the digestive solvent, of anthraquinone, sodium borate and/or polysulfides; and (iii) water (as remainder of the digestive solvent). In some embodiments, the digestive solvent may have an active alkali of between 5 to 25%, more preferably between 10 to 20%. The term "active alkali" (AA), as used herein, is a percentage of alkali compounds combined, expressed as sodium oxide based on weight of the biomass less water content (dry solid biomass). If sodium sulfide is present in the digestive solvent, the sulfidity can range from about 15% to about 40%, preferably from about 20 to about 30%. The term "sulfidity", as used herein, is a percentage ratio of $Na_2S$, expressed as $Na_2O$, to active alkali. Digestive solvent to biomass ratio can be within the range of 0.5 to 50, preferably 2 to 10, most preferably 3 to 5. The digestion is carried out typically at a cooking liquor to biomass ratio in the range of 2 to 6. The digestion reaction is carried out at a temperature within the range of 100° C. to 230° C., and a residence time within 0.25 h to 24 h. The reaction is carried out under conditions effective to provide a pretreated biomass stream containing pretreated biomass having a lignin content of 1% to 20% of the amount in the untreated biomass feed, and a chemical liquor stream containing alkali compounds and dissolved lignin and hemicelluloses material.

The digester can be, for example, a pressure vessel of carbon steel or stainless steel or similar alloy. The digestion system can be carried out in the same vessel or in a separate vessel. The cooking can be done in continuous or batch mode. Suitable pressure vessels include, but are not limited to the "PANDIA™ Digester" (Voest-Alpine Industrienlagenbau GmbH, Linz, Austria), the "DEFIBRATOR Digester" (Sunds Defibrator AB Corporation, Stockholm, Sweden), M&D (Messing & Durkee) digester (Bauer Brothers Company, Springfield, Ohio, USA) and the KAMYR Digester (Andritz Inc., Glens Falls, N.Y., USA). The digestive solvent has a pH from 10 to 14, preferably around 12 to 13 depending on AA. The contents can be kept at a temperature within the range of from 100° C. to 230° C. for a period of time, more preferably within the range from about 130° C. to about 180° C. The period of time can be from about 0.25 to 24.0 hours, preferably from about 0.5 to about 2 hours, after which the pretreated contents of the digester are discharged. For adequate penetration, a sufficient volume of liquor is required to ensure that all the biomass surfaces are wetted. Sufficient liquor is supplied to provide the specified digestive solvent to biomass ratio. The effect of greater dilution is to decrease the concentration of active chemical and thereby reduce the reaction rate.

In a system using the digestive solvent such as a Kraft-like digestive solvent similar to those used in a Kraft pulp and paper process, the chemical liquor may be regenerated in a similar manger to a Kraft pulp and paper chemical regeneration process. For example, in reference to FIG. 2 when used in a Kraft-like digestive solvent system, the recaustisized chemical recycle stream obtained by regenerating at least a portion of the solvent liquor stream through a chemical regeneration system. In an embodiment, chemical liquor stream is obtained by concentrating at least a portion of the solvent liquor stream in a concentration system thereby producing a concentrated chemical liquor stream then burning the concentrated chemical liquor stream in a boiler system thereby producing chemical recycle stream and a flue gas stream then converting the sodium containing compounds to sodium hydroxide in the recaustisizing system by contacting with lime (CaO) producing the recaustisized chemical recycle stream that can be used as a portion of the digestive solvent containing sodium hydroxide.

In another embodiment of the first digestive system, at least partially water miscible organic solvent that has partial solubility in water, preferably greater than 2 weight percent in water, may be used as digestive solvent to aid in digestion of lignin, and the nitrogen, and sulfur compounds. In one such embodiment, the digestive solvent is a water-organic solvent mixture with optional inorganic acid promoters such as HCl or sulfuric acid. Oxygenated solvents exhibiting full or partial water solubility are preferred digestive solvents. In such a process, the organic digestive solvent mixture can be, for example, methanol, ethanol, acetone, ethylene glycol, triethylene glycol and tetrahydrofufuryl alcohol. Organic acids such as acetic, oxalic, acetylsalicylic and salicylic acids can also be used as catalysts (as acid promoter) in the at least partially miscible organic solvent process. Temperatures for the digestion may range from about 130 to about 220 degrees Celsius, preferably from about 140 to 180 degrees Celsius, and contact times from 0.25 to 24 hours, preferably from about one to 4 hours. Preferably, a pressure from about 250 kPa to 7000 kPa, and most typically from 700 to 3500 kPa, is maintained on the system to avoid boiling or flashing away of the solvent.

Optionally the pretreated biomass stream can be washed prior to the second digestive system. In the wash system, the pretreated biomass stream can be washed to remove one or more of non-cellulosic material, non-fibrous cellulosic material, and non-degradable cellulosic material. The pretreated biomass stream is washed with water stream under conditions to remove at least a portion of lignin and hemicellulosic material in the pretreated biomass stream and producing washed pretreated biomass stream. For example, the pretreated biomass stream can be washed with water to remove dissolved substances, including degraded, but non-processable cellulose compounds, solubilised lignin, and/or any remaining alkaline chemicals such as sodium compounds that were used for cooking or produced during the cooking (or predigestion). The washed pretreated biomass stream may contain higher solids content by further processing such as mechanical dewatering as described below. In one embodiment of the invention process, the wash system contains more than one wash steps, for example, first washing, second washing, third washing, etc. that produces washed pretreated biomass stream from first washing, washed digested biomass stream from second washing, etc. operated in a counter current flow with the water, that is then sent to subsequent processes as washed pretreated biomass stream. The water is recycled through first recycled wash stream and second recycled wash stream and then to third recycled wash stream. Water recovered from the chemical liquor stream by the concentration system can be recycled as wash water to wash system. It can be appreciated that the washed steps can be conducted with any number of steps to obtain the desired washed digested biomass stream. Additionally, the washing may adjust the pH for subsequent steps where the pH is about 2.0 to 10.0, where optimal pH is determined by the catalyst employed in the hydrogenolysis step.

In the second digestive system, the pretreated biomass stream is treated with the second digestive solvent. In a preferred embodiment, the pretreated biomass stream is treated with the second digestive solvent counter-currently. The second digestive solvent to pretreated biomass can be within the range of about 0.25 to 10, preferably about 2 to 5. The digestion reaction can be carried out at a temperature within the range of about 60° C. to 240° C., preferably from about 120° C. to about 210° C., and a residence time in the range of about 0.25 h to 5 h. The reaction is carried out under conditions effective to provide a solubilized pulp 174 containing soluble carbohydrates. The second digestive solvent is provided at least in part from the first portion of the oxygenated intermediates produced from the hydrogenolysis system.

In some embodiments, the reactions are carried out in any system of suitable design, including systems comprising continuous-flow, batch, semi-batch or multi-system vessels and reactors. One or more reactions or steps may take place in an individual vessel and the process is not limited to separate reaction vessels for each reaction. In some embodiments the system of the invention utilizes a fluidized catalytic bed system. Preferably, the invention is practiced using a continuous-flow system at steady-state equilibrium.

Nitrogen compounds and sulfur compounds may act as a poison to the hydrogenolysis catalysts that process the soluble carbohydrates to liquid fuels. The aqueous liquor stream that contains the soluble carbohydrates and nitrogen compounds and sulfur compounds are contacted with a purification substrate effective to remove sulfur compounds and nitrogen compounds to produce a treated carbohydrate stream having less than 35% of the sulfur content, preferably less than 10% of the sulfur content, more preferably less than 5%, most preferably less than 3% of the sulfur content, and less than 35% based on the nitrogen content, preferably less than 10% of the nitrogen content, more preferably less than 5%, most preferably less than 3% of the nitrogen content based on the untreated aqueous liquor stream. The purification substrate may be any substrate that is effective to remove nitrogen compounds and sulfur compounds while not reactive (inert) to the soluble carbohydrates. The purification substrate may be, for example, activated carbons, aluminas, silicas, silica-aluminas, clay minerals, diatomatious earth, zirconia, titania, polymeric adsorbents such as XAD-4 or XAD-7 from Rohm and Haas, or especially ion-exchange resins including strong acid cationic resins such as Dowex 88, Purolite C-150 or C-160S, Amberlite IR-120, A-32, FP-C22, anionic base resins such as Dowex 22 or 77, Amberlite A-26, or FP-A90, or especially mixed bed resins such as Amberlite MB-150, or Amberlite MB-20, Purolite A-510S and C-150S, or Dowex 88-MB and Dowex 22, or Dowex 50-MB.

In certain embodiments, the treatment can occur at a temperature in the range of from 15° C. to 120° C., preferably 25° C. to 60° C., and a pressure between 1 bar and 100 bar absolute pressure, with a residence time of at least 0.5 hours, or a volume hourly space velocity defined as the volume of liquid treater per volume of resin per hour, of between 1 and 10.

Each reactor vessel of the invention preferably includes an inlet and an outlet adapted to remove the product stream from the vessel or reactor. In some embodiments, the vessel in which at least some digestion occurs may include additional outlets to allow for the removal of portions of the reactant stream. In some embodiments, the vessel in which at least some digestion occurs may include additional inlets to allow for additional solvents or additives.

The relative composition of the various carbohydrate components in the treated carbohydrate stream affects the formation of undesirable by-products such as heavy ends, tars, and coke in the hydrogenolysis reaction. In particular, a low concentration of carbohydrates in the treated carbohydrate stream can minimize the formation of unwanted by-products. In preferred embodiments, it is desirable to have a concentration of no more than 5%, based upon total liquid, of readily degradable carbohydrates or heavy end precursors and less than 10% of the nitrogen content and less than 10% of the sulfur content based on the untreated carbohydrate stream, while maintaining a total organic intermediates concentration, which can include the oxygenated intermediates (e.g., mono-oxygenates, diols, and/or polyols), as high as possible via use of the recycle concept.

Referring again to FIGS. 1 and 2, according to one embodiment, the treated carbohydrate stream 112 from the removal system 110 can be passed to an hydrogenolysis reaction to produce oxygenated intermediates. The treated carbohydrate stream 112 may comprise C5 and C6 carbohydrates that can be reacted in the hydrogenolysis reaction. For embodiments comprising thermocatalytic hydrogenolysis, oxygenated intermediates such as sugar alcohols, sugar polyols, carboxylic acids, ketones, and/or furans can be converted to fuels in a further processing reaction. The hydrogenolysis reaction can comprise a hydrogenolysis catalyst to aid in the reactions taking place. The hydrogenolysis reaction conditions can be such that a hydrogenolysis reaction can take place along with a hydrogenation reaction, a hydrogenolysis reaction, or both as many of the reaction conditions overlap or are complimentary. The various reactions can result in the formation of one or more oxygenated intermediate streams 122. As used herein, an "oxygenated intermediate" can include one or more polyols, alcohols, ketones, or any other hydrocarbon having at least one oxygen atom. Referring to FIG. 1, in one embodiment, the solubilized pulp may be combined with the treated carbohydrate stream to be passed to an hydrogenolysis reaction. Referring to FIG. 2, in another embodiment, the solubilized pulp may be combined with the aqueous liquor stream to be passed to a purification section to contact a purification substrate.

In a preferred embodiment, the aqueous extraction system, the second digestive system, the purification substrate system and hydrogenolysis system can be operated in a countercurrent fashion as shown in FIG. 3.

In some embodiments, the Various processes are known for performing hydrogenolysis of carbohydrates. One suitable method includes contacting a carbohydrate or stable hydroxyl intermediate with hydrogen or hydrogen mixed with a suitable gas and a hydrogenolysis catalyst in a hydrogenolysis reaction under conditions effective to form a reaction product comprising smaller molecules or polyols. As used herein, the term "smaller molecules or polyols" includes any molecule that has a lower molecular weight, which can include a smaller number of carbon atoms or oxygen atoms than the starting carbohydrate. In an embodiment, the reaction products include smaller molecules that include polyols and alcohols. This aspect of hydrogenolysis entails breaking of carbon-carbon bonds, where hydrogen is supplied to satisfy bonding requirements for the resulting smaller molecules, as shown for the example:

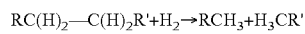

$$RC(H)_2-C(H)_2R'+H_2 \rightarrow RCH_3+H_3CR'$$

where R and R' are any organic moieties.

In an embodiment, a carbohydrate (e.g., a 5 and/or 6 carbon carbohydrate molecule) can be converted to stable hydroxyl intermediates comprising propylene glycol, ethylene glycol, and glycerol using a hydrogenolysis reaction in the presence of a hydrogenolysis catalyst. The hydrogenolysis catalyst may include Cr, Mo, W, Re, Mn, Cu, Cd, Fe, Co, Ni, Pt, Pd, Rh, Ru, Ir, Os, and alloys or any combination thereof, either alone or with promoters such as Au, Ag, Cr, Zn, Mn, Sn, Bi, B, O, and alloys or any combination thereof. The catalysts and promoters may allow for hydrogenation and hydrogenolysis reactions to occur at the same time, such as the hydrogenation of a carbonyl group to form an alcohol. The hydrogenolysis catalyst can also include a carbonaceous pyropolymer catalyst containing transition metals (e.g., chromium, molybdenum, tungsten, rhenium, manganese, copper, cadmium) or Group VIII metals (e.g., iron, cobalt, nickel, platinum, palladium, rhodium, ruthenium, iridium, and osmium). In certain embodiments, the hydrogenolysis catalyst can include any of the above metals combined with an alkaline earth metal oxide or adhered to a catalytically active support. In certain embodiments, the catalyst described in the hydrogenolysis reaction can include a catalyst support as described herein for the hydrogenation reaction.

The conditions for which to carry out the hydrogenolysis reaction will vary based on the type of biomass starting material and the desired products (e.g. gasoline or diesel). One of ordinary skill in the art, with the benefit of this disclosure, will recognize the appropriate conditions to use to carry out the reaction. In general, the hydrogenolysis reaction is conducted at temperatures in the range of 110° C. to 300° C., and preferably of 170° C. to 300° C., and most preferably of 180° C. to 290° C.

In an embodiment, the hydrogenolysis reaction is conducted under basic conditions, preferably at a pH of 8 to 13, and even more preferably at a pH of 10 to 12. In an embodiment, the hydrogenolysis reaction is conducted at pressures in a range between 60 kPa and 16500 kPa, and preferably in a range between 1700 kPa and 14000 kPa, and even more preferably between 4800 kPa and 11000 kPa.

The hydrogen used in the hydrogenolysis reaction of the current invention can include external hydrogen, recycled hydrogen, in situ generated hydrogen, and any combination thereof.

In an embodiment, the use of a hydrogenolysis reaction may produce less carbon dioxide and a greater amount of polyols than a reaction that results in reforming of the reactants. For example, reforming can be illustrated by formation of isopropanol (i.e., IPA, or 2-propanol) from sorbitol:

$$C6H14O6 + H2O \rightarrow 4H2 + 3CO2 + C3H8O; dHR = -40 \text{ kJ/g-mol} \quad (Eq. 1)$$

Alternately, in the presence of hydrogen, polyols and mono-oxygenates such as IPA can be formed by hydrogenolysis, where hydrogen is consumed rather than produced:

$$C6H14O6 + 3H2 \rightarrow 2H2O + 2C3H8O2; dHR = +81 \text{ kJ/gmol} \quad (Eq. 2)$$

$$C6H14O6 + 5H2 \rightarrow 4H2O + 2C3H8O; dHR = -339 \text{ kJ/gmol} \quad (Eq. 3)$$

As a result of the differences in the reaction conditions (e.g., presence of hydrogen), the products of the hydrogenolysis reaction may comprise greater than 25% by mole, or alternatively, greater than 30% by mole of polyols, which may result in a greater conversion in a subsequent processing reaction. In addition, the use of a hydrolysis reaction rather than a reaction running at reforming conditions may result in less than 20% by mole, or alternatively less than 30% by mole carbon dioxide production. As used herein, "oxygenated intermediates" generically refers to hydrocarbon compounds having one or more carbon atoms and between one and three oxygen atoms (referred to herein as $C_{1+}O_{1-3}$ hydrocarbons), such as polyols and smaller molecules (e.g., one or more polyols, alcohols, ketones, or any other hydrocarbon having at least one oxygen atom).

In an embodiment, hydrogenolysis is conducted under neutral or acidic conditions, as needed to accelerate hydrolysis reactions in addition to the hydrogenolysis. Hydrolysis of oligomeric carbohydrates may be combined with hydrogenation to produce sugar alcohols, which can undergo hydrogenolysis.

A second aspect of hydrogenolysis entails the breaking of —OH bonds such as:

$$RC(H)_2—OH + H_2 \rightarrow RCH_3 + H_2O$$

This reaction is also called "hydrodeoxygenation", and may occur in parallel with C—C bond breaking hydrogenolysis. Diols may be converted to mono-oxygenates via this reaction. As reaction severity is increased by increases in temperature or contact time with catalyst, the concentration of polyols and diols relative to mono-oxygenates will diminish, as a result of this reaction. Selectivity for C—C vs. C—OH bond hydrogenolysis will vary with catalyst type and formulation. Full de-oxygenation to alkanes can also occur, but is generally undesirable if the intent is to produce mono-oxygenates or diols and polyols which can be condensed or oligomerized to higher molecular weight fuels, in a subsequent processing step. Typically, it is desirable to send only mono-oxygenates or diols to subsequent processing steps, as higher polyols can lead to excessive coke formation on condensation or oligomerization catalysts, while alkanes are essentially unreactive and cannot be combined to produce higher molecular weight fuels.

In an embodiment of the invention, the pretreated biomass containing carbohydrates may be converted into an stable hydroxyl intermediate comprising the corresponding alcohol derivative through a hydrogenolysis reaction in addition to an optional hydrogenation reaction in a suitable reaction vessel (such as hydrogenation reaction as described in co-pending patent application publication nos. US2011/0154721 and US2011/0282115 which disclosures are hereby incorporated by reference).

The oxygenated intermediate stream 122 may then pass from the hydrogenolysis reaction to an further processing stage 130. In some embodiments, optional separation stage includes elements that allow for the separation of the oxygenated intermediates into different components. In some embodiments of the present invention, the separation stage can receive the oxygenated intermediate stream 133 from the hydrogenolysis reaction and separate the various components into two or more streams. For example, a suitable separator may include, but is not limited to, a phase separator, stripping column, extractor, or distillation column. In some embodiments, a separator is installed prior to a processing reaction to favor production of higher hydrocarbons by separating the higher polyols from the oxygenated intermediates. In such an embodiment, the higher polyols can be recycled back through to the hydrogenolysis reaction, while the other oxygenated intermediates are passed to the processing reaction 130. In addition, an outlet stream from the separation stage containing a portion of the oxygenated intermediates act as in situ generated solvent when recycled to the second digestive system 190. In one embodiment, the separation stage can also be used to remove some or all of the lignin from the oxygenated intermediate stream. The lignin may be passed out of the separation stage as a separate stream, for example as output stream.

The hydrogenolysis recycle stream 124 can comprise a number of components including in situ generated solvents, which may be useful as the soluble organic solvent at least in part or in entirety. The term "in situ" as used herein refers to a component that is produced within the overall process; it is not limited to a particular reactor for production or use and is therefore synonymous with an in process generated component. The in situ generated solvents may comprise oxygenated intermediates. The composition of the intermediate carbohydrate stream 122 may vary and may comprise a number of different compounds. Preferably, the carbohydrates have 2 to 12 carbon atoms, and even more preferably 2 to 6 carbon atoms. The carbohydrates may also have an oxygen to carbon ratio from 0.5:1 to 1:1.2.

Organic in situ generated solvents, which may comprise a portion of the oxygenated intermediates, including, but not limited to, light alcohols and polyols, can assist in solubilization and extraction of lignin and other components.

The oxygenated intermediates can be processed to produce a fuel blend in one or more processing reactions. In an embodiment, a condensation reaction can be used along with other reactions to generate a fuel blend and may be catalyzed by a catalyst comprising acid or basic functional sites, or both. In general, without being limited to any particular theory, it is believed that the basic condensation reactions generally consist of a series of steps involving: (1) an optional dehydrogenation reaction; (2) an optional dehydration reaction that may be acid catalyzed; (3) an aldol condensation reaction; (4) an optional ketonization reaction; (5) an optional furanic ring opening reaction; (6) hydrogenation of the resulting condensation products to form a C4+ hydrocarbon; and (7) any combination thereof. Acid catalyzed condensations may similarly entail optional hydrogenation or dehydrogenation reactions, dehydration, and oligomerization reactions. Additional polishing reactions may also be used to conform the product to a specific fuel standard, including reactions conducted in the presence of hydrogen and a hydrogenation catalyst to remove functional groups from final fuel product. A catalyst comprising a basic functional site, both an acid and a basic functional site, and optionally comprising a metal function, may be used to effect the condensation reaction.

In an embodiment, the aldol condensation reaction may be used to produce a fuel blend meeting the requirements for a diesel fuel or jet fuel. Traditional diesel fuels are petroleum distillates rich in paraffinic hydrocarbons. They have boiling ranges as broad as 187° C. to 417° C., which are suitable for combustion in a compression ignition engine, such as a diesel engine vehicle. The American Society of Testing and Materials (ASTM) establishes the grade of diesel according to the boiling range, along with allowable ranges of other fuel properties, such as cetane number, cloud point, flash point, viscosity, aniline point, sulfur content, water content, ash content, copper strip corrosion, and carbon residue. Thus, any fuel blend meeting ASTM D975 can be defined as diesel fuel.

The present invention also provides methods to produce jet fuel. Jet fuel is clear to straw colored. The most common fuel is an unleaded/paraffin oil-based aviation fuel classified as Aeroplane A-1, which is produced to an internationally standardized set of specifications. Jet fuel is a mixture of a large number of different hydrocarbons, possibly as many as a thousand or more. The range of their sizes (molecular weights or carbon numbers) is restricted by the requirements for the product, for example, freezing point or smoke point. Kerosene-type Airplane or aviation fuel (including Jet A and Jet A-1) has a carbon number distribution between about C8 and C16. Wide-cut or naphtha-type Airplane fuel (including Jet B) typically has a carbon number distribution between about C5 and C15. A fuel blend meeting ASTM D1655 can be defined as jet fuel.

In certain embodiments, both aviation fuels (Jet A and Jet B) contain a number of additives. Useful additives include, but are not limited to, antioxidants, antistatic agents, corrosion inhibitors, and fuel system icing inhibitor (FSII) agents. Antioxidants prevent gumming and usually, are based on alkylated phenols, for example, AO-30, AO-31, or AO-37. Antistatic agents dissipate static electricity and prevent sparking. Stadis 450 with dinonylnaphthylsulfonic acid (DINNSA) as the active ingredient, is an example. Corrosion inhibitors, e.g., DCI-4A are used for civilian and military fuels and DCI-6A is used for military fuels. FSII agents, include, e.g., Di-EGME.

In an embodiment, the oxygenated intermediates may comprise a carbonyl-containing compound that can take part in a base catalyzed condensation reaction. In some embodiments, an optional dehydrogenation reaction may be used to increase the amount of carbonyl-containing compounds in the oxygenated intermediate stream to be used as a feed to the condensation reaction. In these embodiments, the oxygenated intermediates and/or a portion of the bio-based feedstock stream can be dehydrogenated in the presence of a catalyst.

In an embodiment, a dehydrogenation catalyst may be preferred for an oxygenated intermediate stream comprising alcohols, diols, and triols. In general, alcohols cannot participate in aldol condensation directly. The hydroxyl group or groups present can be converted into carbonyls (e.g., aldehydes, ketones, etc.) in order to participate in an aldol condensation reaction. A dehydrogenation catalyst may be included to effect dehydrogenation of any alcohols, diols, or polyols present to form ketones and aldehydes. The dehydration catalyst is typically formed from the same metals as used for hydrogenation or aqueous phase reforming, which catalysts are described in more detail above. Dehydrogenation yields are enhanced by the removal or consumption of hydrogen as it forms during the reaction. The dehydrogenation step may be carried out as a separate reaction step before an aldol condensation reaction, or the dehydrogenation reaction may be carried out in concert with the aldol condensation reaction. For concerted dehydrogenation and aldol condensation, the dehydrogenation and aldol condensation functions can be on the same catalyst. For example, a metal hydrogenation/dehydrogenation functionality may be present on catalyst comprising a basic functionality.

The dehydrogenation reaction may result in the production of a carbonyl-containing compound. Suitable carbonyl-containing compounds include, but are not limited to, any compound comprising a carbonyl functional group that can form carbanion species or can react in a condensation reaction with a carbanion species, where "carbonyl" is defined as a carbon atom doubly-bonded to oxygen. In an embodiment, a carbonyl-containing compound can include, but is not limited to, ketones, aldehydes, furfurals, hydroxy carboxylic acids, and, carboxylic acids. The ketones may include, without limitation, hydroxyketones, cyclic ketones, diketones, acetone, propanone, 2-oxopropanal, butanone, butane-2,3-dione, 3-hydroxybutane-2-one, pentanone, cyclopentanone, pentane-2,3-dione, pentane-2,4-dione, hexanone, cyclohexanone, 2-methyl-cyclopentanone, heptanone, octanone, nonanone, decanone, undecanone, dodecanone, methylglyoxal, butanedione, pentanedione, diketohexane, dihydroxyacetone, and isomers thereof. The aldehydes may include, without limitation, hydroxyaldehydes, acetaldehyde, glyceraldehyde, propionaldehyde, butyraldehyde, pentanal, hexanal, heptanal, octanal, nonal, decanal, undecanal, dodecanal, and isomers thereof. The carboxylic acids may include, without limitation, formic acid, acetic acid, propionic acid, butanoic acid, pentanoic acid, hexanoic acid, heptanoic acid, isomers and derivatives thereof, including hydroxylated derivatives, such as 2-hydroxybutanoic acid and lactic acid. Furfurals include, without limitation, hydroxylmethylfurfural, 5-hydroxymethyl-2(5H)-furanone, dihydro-5-(hydroxymethyl)-2(3H)-furanone, tetrahydro-2-furoic acid, dihydro-5-(hydroxymethyl)-2(3H)-furanone, tetrahydrofurfuryl alcohol, 1-(2-furyl)ethanol, hydroxymethyltetrahydrofurfural, and isomers thereof. In an embodiment, the dehydrogenation reaction results in the production of a carbonyl-containing compound that is combined with the oxygenated intermediates to become a part of the oxygenated intermediates fed to the condensation reaction.

In an embodiment, an acid catalyst may be used to optionally dehydrate at least a portion of the oxygenated intermediate stream. Suitable acid catalysts for use in the dehydration reaction include, but are not limited to, mineral acids (e.g., HCl, $H_2SO_4$), solid acids (e.g., zeolites, ion-exchange resins) and acid salts (e.g., $LaCl_3$). Additional acid catalysts may include, without limitation, zeolites, carbides, nitrides, zirconia, alumina, silica, aluminosilicates, phosphates, titanium oxides, zinc oxides, vanadium oxides, lanthanum oxides, yttrium oxides, scandium oxides, magnesium oxides, cerium oxides, barium oxides, calcium oxides, hydroxides, heteropolyacids, inorganic acids, acid modified resins, base modified resins, and any combination thereof. In some embodiments, the dehydration catalyst can also include a modifier. Suitable modifiers include La, Y, Sc, P, B, Bi, Li, Na, K, Rb, Cs, Mg, Ca, Sr, Ba, and any combination thereof. The modifiers may be useful, inter alia, to carry out a concerted hydrogenation/dehydrogenation reaction with the dehydration reaction. In some embodiments, the dehydration catalyst can also include a metal. Suitable metals include Cu, Ag, Au, Pt, Ni, Fe, Co, Ru, Zn, Cd, Ga, In, Rh, Pd, Ir, Re, Mn, Cr, Mo, W, Sn, Os, alloys, and any combination thereof. The dehydration catalyst may be self supporting, supported on an inert support or resin, or it may be dissolved in solution.

In some embodiments, the dehydration reaction occurs in the vapor phase. In other embodiments, the dehydration reaction occurs in the liquid phase. For liquid phase dehydration reactions, an aqueous solution may be used to carry out the reaction. In an embodiment, other solvents in addition to water, are used to form the aqueous solution. For example, water soluble organic solvents may be present. Suitable solvents can include, but are not limited to, hydroxymethylfurfural (HMF), dimethylsulfoxide (DMSO), 1-methyl-n-pyrollidone (NMP), and any combination thereof. Other suitable aprotic solvents may also be used alone or in combination with any of these solvents.

In an embodiment, the processing reactions may comprise an optional ketonization reaction. A ketonization reaction may increase the number of ketone functional groups within at least a portion of the oxygenated intermediate stream. For example, an alcohol or other hydroxyl functional group can be converted into a ketone in a ketonization reaction. Ketonization may be carried out in the presence of a base catalyst. Any of the base catalysts described above as the basic component of the aldol condensation reaction can be used to effect a ketonization reaction. Suitable reaction conditions are known to one of ordinary skill in the art and generally correspond to the reaction conditions listed above with respect to the aldol condensation reaction. The ketonization reaction may be carried out as a separate reaction step, or it may be carried out in concert with the aldol condensation reaction. The inclusion of a basic functional site on the aldol condensation catalyst may result in concerted ketonization and aldol condensation reactions.

In an embodiment, the processing reactions may comprise an optional furanic ring opening reaction. A furanic ring opening reaction may result in the conversion of at least a portion of any oxygenated intermediates comprising a furanic ring into compounds that are more reactive in an aldol condensation reaction. A furanic ring opening reaction may be carried out in the presence of an acidic catalyst. Any of the acid catalysts described above as the acid component of the aldol condensation reaction can be used to effect a furanic ring opening reaction. Suitable reaction conditions are known to one of ordinary skill in the art and generally correspond to the reaction conditions listed above with respect to the aldol condensation reaction. The furanic ring opening reaction may be carried out as a separate reaction step, or it may be carried out in concert with the aldol condensation reaction. The inclusion of an acid functional site on the aldol condensation catalyst may result in a concerted furanic ring opening reaction and aldol condensation reactions. Such an embodiment may be advantageous as any furanic rings can be opened in the presence of an acid functionality and reacted in an aldol condensation reaction using a base functionality. Such a concerted reaction scheme may allow for the production of a greater amount of higher hydrocarbons to be formed for a given oxygenated intermediate feed.

In an embodiment, production of a C4+ compound occurs by condensation, which may include aldol-condensation, of the oxygenated intermediates in the presence of a condensation catalyst. Aldol-condensation generally involves the carbon-carbon coupling between two compounds, at least one of which may contain a carbonyl group, to form a larger organic molecule. For example, acetone may react with hydroxymethylfurfural to form a C9 species, which may subsequently react with another hydroxymethylfurfural molecule to form a C15 species. The reaction is usually carried out in the presence of a condensation catalyst. The condensation reaction may be carried out in the vapor or liquid phase. In an embodiment, the reaction may take place at a temperature in the range of from about 5° C. to about 375° C., depending on the reactivity of the carbonyl group.

The condensation catalyst will generally be a catalyst capable of forming longer chain compounds by linking two molecules through a new carbon-carbon bond, such as a basic catalyst, a multi-functional catalyst having both acid and base functionality, or either type of catalyst also comprising an optional metal functionality. In an embodiment, the multi-functional catalyst will be a catalyst having both a strong acid and a strong base functionality. In an embodiment, aldol catalysts can comprise Li, Na, K, Cs, B, Rb, Mg, Ca, Sr, Si, Ba, Al, Zn, Ce, La, Y, Sc, Y, Zr, Ti, hydrotalcite, zinc-aluminate, phosphate, base-treated aluminosilicate zeolite, a basic resin, basic nitride, alloys or any combination thereof. In an embodiment, the base catalyst can also comprise an oxide of Ti, Zr, V, Nb, Ta, Mo, Cr, W, Mn, Re, Al, Ga, In, Co, Ni, Si, Cu, Zn, Sn, Cd, Mg, P, Fe, or any combination thereof. In an embodiment, the condensation catalyst comprises a mixed-oxide base catalysts. Suitable mixed-oxide base catalysts can comprise a combination of magnesium, zirconium, and oxygen, which may comprise, without limitation: Si—Mg—O, Mg—Ti—O, Y—Mg—O, Y—Zr—O, Ti—Zr—O, Ce—Zr—O, Ce—Mg—O, Ca—Zr—O, La—Zr—O, B—Zr—O, La—Ti—O, B—Ti—O, and any combinations thereof. Different atomic ratios of Mg/Zr or the combinations of various other elements constituting the mixed oxide catalyst may be used ranging from about 0.01 to about 50. In an embodiment, the condensation catalyst further includes a metal or alloys comprising metals, such as Cu, Ag, Au, Pt, Ni, Fe, Co, Ru, Zn, Cd, Ga, In, Rh, Pd, Ir, Re, Mn, Cr, Mo, W, Sn, Bi, Pb, Os, alloys and combinations thereof. Such metals may be preferred when a dehydrogenation reaction is to be carried out in concert with the aldol condensation reaction. In an embodiment, preferred Group IA materials include Li, Na, K, Cs and Rb. In an embodiment, preferred Group IIA materials include Mg, Ca, Sr and Ba. In an embodiment, Group IIB materials include Zn and Cd. In an embodiment, Group IIIB materials include Y and La. Basic resins include resins that exhibit basic functionality. The base catalyst may be self-supporting or adhered to any one of the supports further described below, including supports containing carbon, silica, alumina, zirconia, titania, vanadia, ceria, nitride, boron nitride, heteropolyacids, alloys and mixtures thereof.

In one embodiment, the condensation catalyst is derived from the combination of MgO and $Al_2O_3$ to form a hydrotalcite material. Another preferred material contains ZnO and $Al_2O_3$ in the form of a zinc aluminate spinel. Yet another preferred material is a combination of ZnO, $Al_2O_3$, and CuO. Each of these materials may also contain an additional metal function provided by a Group VIIIB metal, such as Pd or Pt. Such metals may be preferred when a dehydrogenation reaction is to be carried out in concert with the aldol condensation reaction. In one embodiment, the base catalyst is a metal oxide containing Cu, Ni, Zn, V, Zr, or mixtures thereof. In another embodiment, the base catalyst is a zinc aluminate metal containing Pt, Pd Cu, Ni, or mixtures thereof.

Preferred loading of the primary metal in the condensation catalyst is in the range of 0.10 wt % to 25 wt %, with weight percentages of 0.10% and 0.05% increments between, such as 1.00%, 1.10%, 1.15%, 2.00%, 2.50%, 5.00%, 10.00%, 12.50%, 15.00% and 20.00%. The preferred atomic ratio of the second metal, if any, is in the range of 0.25-to-1 to 10-to-1, including ratios there between, such as 0.50, 1.00, 2.50, 5.00, and 7.50-to-1.

In some embodiments, the base catalyzed condensation reaction is performed using a condensation catalyst with both an acid and base functionality. The acid-aldol condensation catalyst may comprise hydrotalcite, zinc-aluminate, phosphate, Li, Na, K, Cs, B, Rb, Mg, Si, Ca, Sr, Ba, Al, Ce, La, Sc, Y, Zr, Ti, Zn, Cr, or any combination thereof. In further embodiments, the acid-base catalyst may also include one or more oxides from the group of Ti, Zr, V, Nb, Ta, Mo, Cr, W, Mn, Re, Al, Ga, In, Fe, Co, Ir, Ni, Si, Cu, Zn, Sn, Cd, P, and combinations thereof. In an embodiment, the acid-base catalyst includes a metal functionality provided by Cu, Ag, Au, Pt, Ni, Fe, Co, Ru, Zn, Cd, Ga, In, Rh, Pd, Ir, Re, Mn, Cr, Mo, W, Sn, Os, alloys or combinations thereof. In one embodiment, the catalyst further includes Zn, Cd or phosphate. In one embodiment, the condensation catalyst is a metal oxide containing Pd, Pt, Cu or Ni, and even more preferably an aluminate or zirconium metal oxide containing Mg and Cu, Pt, Pd or Ni. The acid-base catalyst may also include a hydroxyapatite (HAP) combined with any one or more of the above metals. The acid-base catalyst may be self-supporting or adhered to any one of the supports further described below, including supports containing carbon, silica, alumina, zirconia, titania, vanadia, ceria, nitride, boron nitride, heteropolyacids, alloys and mixtures thereof.

In an embodiment, the condensation catalyst may also include zeolites and other microporous supports that contain Group IA compounds, such as Li, NA, K, Cs and Rb. Preferably, the Group IA material is present in an amount less than that required to neutralize the acidic nature of the support. A metal function may also be provided by the addition of group VIIIB metals, or Cu, Ga, In, Zn or Sn. In one embodiment, the condensation catalyst is derived from the combination of MgO and $Al_2O_3$ to form a hydrotalcite material. Another preferred material contains a combination of MgO and $ZrO_2$, or a combination of ZnO and $Al_2O_3$. Each of these materials may also contain an additional metal function provided by copper or a Group VIIIB metal, such as Ni, Pd, Pt, or combinations of the foregoing.

If a Group IIB, VIIB, VIIB, VIIIB, IIA or IVA metal is included in the condensation catalyst, the loading of the metal is in the range of 0.10 wt % to 10 wt %, with weight percentages of 0.10% and 0.05% increments between, such as 1.00%, 1.10%, 1.15%, 2.00%, 2.50%, 5.00% and 7.50%, etc. If a second metal is included, the preferred atomic ratio of the second metal is in the range of 0.25-to-1 to 5-to-1, including ratios there between, such as 0.50, 1.00, 2.50 and 5.00-to-1.

The condensation catalyst may be self-supporting (i.e., the catalyst does not need another material to serve as a support), or may require a separate support suitable for suspending the catalyst in the reactant stream. One exemplary support is silica, especially silica having a high surface area (greater than 100 square meters per gram), obtained by sol-gel synthesis, precipitation, or fuming. In other embodiments, particularly when the condensation catalyst is a powder, the catalyst system may include a binder to assist in forming the catalyst into a desirable catalyst shape. Applicable forming processes include extrusion, pelletization, oil dropping, or other known processes. Zinc oxide, alumina, and a peptizing agent may also be mixed together and extruded to produce a formed material. After drying, this material is calcined at a temperature appropriate for formation of the catalytically active phase, which usually requires temperatures in excess of 450° C. Other catalyst supports as known to those of ordinary skill in the art may also be used.

In some embodiments, a dehydration catalyst, a dehydrogenation catalyst, and the condensation catalyst can be present in the same reactor as the reaction conditions overlap to some degree. In these embodiments, a dehydration reaction and/or a dehydrogenation reaction may occur substantially simultaneously with the condensation reaction. In some embodiments, a catalyst may comprise active sites for a dehydration reaction and/or a dehydrogenation reaction in addition to a condensation reaction. For example, a catalyst may comprise active metals for a dehydration reaction and/or a dehydrogenation reaction along with a condensation reaction at separate sites on the catalyst or as alloys. Suitable active elements can comprise any of those listed above with respect to the dehydration catalyst, dehydrogenation catalyst, and the condensation catalyst. Alternately, a physical mixture of dehydration, dehydrogenation, and condensation catalysts could be employed. While not intending to be limited by theory, it is believed that using a condensation catalyst comprising a metal and/or an acid functionality may assist in pushing the equilibrium limited aldol condensation reaction towards completion. Advantageously, this can be used to effect multiple condensation reactions with dehydration and/or dehydrogenation of intermediates, in order to form (via condensation, dehydration, and/or dehydrogenation) higher molecular weight oligomers as desired to produce jet or diesel fuel.

The specific C4+ compounds produced in the condensation reaction will depend on various factors, including, without limitation, the type of oxygenated intermediates in the reactant stream, condensation temperature, condensation pressure, the reactivity of the catalyst, and the flow rate of the reactant stream as it affects the space velocity, GHSV and WHSV. Preferably, the reactant stream is contacted with the condensation catalyst at a WHSV that is appropriate to produce the desired hydrocarbon products. The WHSV is preferably at least about 0.1 grams of oxygenated intermediates in the reactant stream per hour, more preferably the WHSV is between about 0.1 to 40.0 g/g hr, including a WHSV of about 1, 2, 3, 4, 5, 6, 7, 8, 9, 10, 11, 12, 13, 14, 15, 20, 25, 30, 35 g/g hr, and increments between.

In general, the condensation reaction should be carried out at a temperature at which the thermodynamics of the proposed reaction are favorable. For condensed phase liquid reactions, the pressure within the reactor must be sufficient to maintain at least a portion of the reactants in the condensed liquid phase at the reactor inlet. For vapor phase reactions, the reaction should be carried out at a temperature where the vapor pressure of the oxygenates is at least about 10 kPa, and the thermodynamics of the reaction are favorable. The condensation temperature will vary depending upon the specific oxygenated intermediates used, but is generally in the range of from about 75° C. to 500° C. for reactions taking place in the vapor phase, and more preferably from about 125° C. to 450° C. For liquid phase reactions, the condensation temperature may be from about 5° C. to 475° C., and the condensation pressure from about 0.1 kPa to 10,000 kPa. Preferably, the condensation temperature is between about 15° C. and 300° C., or between about 15° C. and 250° C. for difficult substrates.

Varying the factors above, as well as others, will generally result in a modification to the specific composition and yields of the C4+ compounds. For example, varying the temperature and/or pressure of the reactor system, or the particular catalyst formulations, may result in the production of C4+ alcohols and/or ketones instead of C4+ hydrocarbons. The C4+ hydrocarbon product may also contain a variety of olefins, and alkanes of various sizes (typically branched alkanes). Depending upon the condensation catalyst used, the hydrocarbon product may also include aromatic and cyclic hydrocarbon compounds. The C4+ hydrocarbon product may also contain undesirably high levels of olefins, which may lead to coking or deposits in combustion engines, or other undesirable hydrocarbon products. In such event, the hydrocarbon molecules produced may be optionally hydrogenated to reduce the ketones to alcohols and hydrocarbons, while the alcohols and unsaturated hydrocarbon may be reduced to alkanes, thereby forming a more desirable hydrocarbon product having low levels of olefins, aromatics or alcohols.

The condensation reactions may be carried out in any reactor of suitable design, including continuous-flow, batch, semi-batch or multi-system reactors, without limitation as to design, size, geometry, flow rates, etc. The reactor system may also use a fluidized catalytic bed system, a swing bed system, fixed bed system, a moving bed system, or a combination of the above. In some embodiments, bi-phasic (e.g., liquid-liquid) and tri-phasic (e.g., liquid-liquid-solid) reactors may be used to carry out the condensation reactions.

In a continuous flow system, the reactor system can include an optional dehydrogenation bed adapted to produce dehydrogenated oxygenated intermediates, an optional dehydration bed adapted to produce dehydrated oxygenated intermediates, and a condensation bed to produce C4+ compounds from the oxygenated intermediates. The dehydrogenation bed is configured to receive the reactant stream and produce the desired oxygenated intermediates, which may have an increase in the amount of carbonyl-containing compounds. The de-hydration bed is configured to receive the reactant stream and produce the desired oxygenated intermediates. The condensation bed is configured to receive the oxygenated intermediates for contact with the condensation catalyst and production of the desired C4+ compounds. For systems with one or more finishing steps, an additional reaction bed for conducting the finishing process or processes may be included after the condensation bed.

In an embodiment, the optional dehydration reaction, the optional dehydrogenation reaction, the optional ketonization reaction, the optional ring opening reaction, and the condensation reaction catalyst beds may be positioned within the same reactor vessel or in separate reactor vessels in fluid communication with each other. Each reactor vessel preferably includes an outlet adapted to remove the product stream from the reactor vessel. For systems with one or more finishing steps, the finishing reaction bed or beds may be within the same reactor vessel along with the condensation bed or in a separate reactor vessel in fluid communication with the reactor vessel having the condensation bed.

In an embodiment, the reactor system also includes additional outlets to allow for the removal of portions of the reactant stream to further advance or direct the reaction to the desired reaction products, and to allow for the collection and recycling of reaction byproducts for use in other portions of the system. In an embodiment, the reactor system also includes additional inlets to allow for the introduction of supplemental materials to further advance or direct the reaction to the desired reaction products, and to allow for the recycling of reaction byproducts for use in other reactions.

In an embodiment, the reactor system also includes elements which allow for the separation of the reactant stream into different components which may find use in different reaction schemes or to simply promote the desired reactions. For instance, a separator unit, such as a phase separator, extractor, purifier or distillation column, may be installed prior to the condensation step to remove water from the reactant stream for purposes of advancing the condensation reaction to favor the production of higher hydrocarbons. In an embodiment, a separation unit is installed to remove specific intermediates to allow for the production of a desired product stream containing hydrocarbons within a particular carbon number range, or for use as end products or in other systems or processes.

The condensation reaction can produce a broad range of compounds with carbon numbers ranging from C4 to C30 or greater. Exemplary compounds include, but are not limited to, C4+ alkanes, C4+ alkenes, C5+ cycloalkanes, C5+ cycloalkenes, aryls, fused aryls, C4+ alcohols, C4+ ketones, and mixtures thereof. The C4+ alkanes and C4+ alkenes may range from 4 to 30 carbon atoms (C4-C30 alkanes and C4-C30 alkenes) and may be branched or straight chained alkanes or alkenes. The C4+ alkanes and C4+ alkenes may also include fractions of C7-C14, C12-C24 alkanes and alkenes, respectively, with the C7-C14 fraction directed to jet fuel blend, and the C12-C24 fraction directed to a diesel fuel blend and other industrial applications. Examples of various C4+ alkanes and C4+ alkenes include, without limitation, butane, butene, pentane, pentene, 2-methylbutane, hexane, hexene, 2-methylpentane, 3-methylpentane, 2,2-dimethylbutane, 2,3-dimethylbutane, heptane, heptene, octane, octene, 2,2,4,-trimethylpentane, 2,3-dimethyl hexane, 2,3,4-trimethylpentane, 2,3-dimethylpentane, nonane, nonene, decane, decene, undecane, undecene, dodecane, dodecene, tridecane, tridecene, tetradecane, tetradecene, pentadecane, pentadecene, hexadecane, hexadecene, heptyldecane, heptyldecene, octyldecane, octyldecene, nonyldecane, nonyldecene, eicosane, eicosene, uneicosane, uneicosene, doeicosane, doeicosene, trieicosane, trieicosene, tetraeicosane, tetraeicosene, and isomers thereof.

The C5+ cycloalkanes and C5+ cycloalkenes have from 5 to 30 carbon atoms and may be unsubstituted, mono-substituted or multi-substituted. In the case of mono-substituted and multi-substituted compounds, the substituted group may include a branched C3+ alkyl, a straight chain C1+ alkyl, a branched C3+ alkylene, a straight chain C1+ alkylene, a straight chain C2+ alkylene, a phenyl or a combination thereof. In one embodiment, at least one of the substituted groups include a branched C3-C12 alkyl, a straight chain C1-C12 alkyl, a branched C3-C12 alkylene, a straight chain C1-C12 alkylene, a straight chain C2-C12 alkylene, a phenyl or a combination thereof. In yet another embodiment, at least one of the substituted groups includes a branched C3-C4 alkyl, a straight chain C1-C4 alkyl, a branched C3-C4 alkylene, a straight chain C1-C4 alkylene, a straight chain C2-C4 alkylene, a phenyl, or any combination thereof. Examples of desirable C5+ cycloalkanes and C5+ cycloalkenes include, without limitation, cyclopentane, cyclopentene, cyclohexane, cyclohexene, methyl-cyclopentane, methyl-cyclopentene, ethyl-cyclopentane, ethyl-cyclopentene, ethyl-cyclohexane, ethyl-cyclohexene, and isomers thereof.

Aryls will generally consist of an aromatic hydrocarbon in either an unsubstituted (phenyl), mono-substituted or multi-substituted form. In the case of mono-substituted and multi-substituted compounds, the substituted group may include a branched C3+ alkyl, a straight chain C1+ alkyl, a branched C3+ alkylene, a straight chain C2+ alkylene, a phenyl or a combination thereof. In one embodiment, at least one of the substituted groups includes a branched C3-C12 alkyl, a straight chain C1-C12 alkyl, a branched C3-C12 alkylene, a straight chain C2-C12 alkylene, a phenyl, or any combination thereof. In yet another embodiment, at least one of the substituted groups includes a branched C3-C4 alkyl, a straight chain C1-C4 alkyl, a branched C3-C4 alkylene, straight chain C2-C4 alkylene, a phenyl, or any combination thereof. Examples of various aryls include, without limitation, benzene, toluene, xylene (dimethylbenzene), ethyl benzene, para xylene, meta xylene, ortho xylene, C9 aromatics.

Fused aryls will generally consist of bicyclic and polycyclic aromatic hydrocarbons, in either an unsubstituted, mono-substituted or multi-substituted form. In the case of mono-substituted and multi-substituted compounds, the substituted group may include a branched C3+ alkyl, a straight chain C1+ alkyl, a branched C3+ alkylene, a straight chain C2+ alkylene, a phenyl or a combination thereof. In another embodiment, at least one of the substituted groups includes a branched C3-C4 alkyl, a straight chain C1-C4 alkyl, a branched C3-C4 alkylene, a straight chain C2-C4 alkylene, a phenyl, or any combination thereof. Examples of various fused aryls include, without limitation, naphthalene, anthracene, tetrahydronaphthalene, and decahydronaphthalene, indane, indene, and isomers thereof.

The moderate fractions, such as C7-C14, may be separated for jet fuel, while heavier fractions, (e.g., C12-C24), may be separated for diesel use. The heaviest fractions may be used as lubricants or cracked to produce additional gasoline and/or diesel fractions. The C4+ compounds may also find use as industrial chemicals, whether as an intermediate or an end product. For example, the aryls toluene, xylene, ethyl benzene, para xylene, meta xylene, ortho xylene may find use as chemical intermediates for the production of plastics and other products. Meanwhile, the C9 aromatics and fused aryls, such as naphthalene, anthracene, tetrahydronaphthalene, and decahydronaphthalene, may find use as solvents in industrial processes.

In an embodiment, additional processes are used to treat the fuel blend to remove certain components or further conform the fuel blend to a diesel or jet fuel standard. Suitable techniques include hydrotreating to reduce the amount of or remove any remaining oxygen, sulfur, or nitrogen in the fuel blend. The conditions for hydrotreating a hydrocarbon stream are known to one of ordinary skill in the art.

In an embodiment, hydrogenation is carried out in place of or after the hydrotreating process to saturate at least some olefinic bonds. In some embodiments, a hydrogenation reaction may be carried out in concert with the aldol condensation reaction by including a metal functional group with the aldol condensation catalyst. Such hydrogenation may be performed to conform the fuel blend to a specific fuel standard (e.g., a diesel fuel standard or a jet fuel standard). The hydrogenation of the fuel blend stream can be carried out according to known procedures, either with the continuous or batch method. The hydrogenation reaction may be used to remove a remaining carbonyl group or hydroxyl group. In such event, any one of the hydrogenation catalysts described above may be used. Such catalysts may include any one or more of the following metals, Cu, Ni, Fe, Co, Ru, Pd, Rh, Pt, Ir, Os, alloys or combinations thereof, alone or with promoters such as Au, Ag, Cr, Zn, Mn, Sn, Cu, Bi, and alloys thereof, may be used in various loadings ranging from about 0.01 wt % to about 20 wt % on a support as described above. In general, the finishing step is carried out at finishing temperatures of between about 80° C. to 250° C., and finishing pressures in the range of about 700 kPa to 15,000 kPa. In one embodiment, the finishing step is conducted in the vapor phase or liquid phase, and uses in situ generated H2 (e.g., generated in the hydrogenolysis reaction step), external H2, recycled H2, or combinations thereof, as necessary.

In an embodiment, isomerization is used to treat the fuel blend to introduce a desired degree of branching or other shape selectivity to at least some components in the fuel blend. It may be useful to remove any impurities before the hydrocarbons are contacted with the isomerization catalyst. The isomerization step comprises an optional stripping step, wherein the fuel blend from the oligomerization reaction may be purified by stripping with water vapor or a suitable gas such as light hydrocarbon, nitrogen or hydrogen. The optional stripping step is carried out in a counter-current manner in a unit upstream of the isomerization catalyst, wherein the gas and liquid are contacted with each other, or before the actual isomerization reactor in a separate stripping unit utilizing counter-current principle.

After the optional stripping step the fuel blend can be passed to a reactive isomerization unit comprising one or several catalyst bed(s). The catalyst beds of the isomerization step may operate either in co-current or counter-current manner. In the isomerization step, the pressure may vary from 2000 kPa to 15,000 kPa, preferably in the range of 2000 kPa to 10,000 kPa, the temperature being between 200° C. and 500° C., preferably between 300° C. and 400° C. In the isomerization step, any isomerization catalysts known in the art may be used. Suitable isomerization catalysts can contain molecular sieve and/or a metal from Group VII and/or a carrier. In an embodiment, the isomerization catalyst contains SAPO-11 or SAPO41 or ZSM-22 or ZSM-23 or ferrierite and Pt, Pd or Ni and $Al_2O_3$ or $SiO_2$. Typical isomerization catalysts are, for example, Pt/SAPO-11/$Al_2O_3$, Pt/ZSM-22/$Al_2O_3$, Pt/ZSM-23/$Al_2O_3$ and Pt/SAPO-11/$SiO_2$.

Other factors, such as the concentration of water or undesired oxygenated intermediates, may also effect the composition and yields of the C4+ compounds, as well as the activity and stability of the condensation catalyst. In such event, the process may include a dewatering step that removes a portion of the water prior to the condensation reaction and/or the optional dehydration reaction, or a separation unit for removal of the undesired oxygenated intermediates. For instance, a separator unit, such as a phase separator, extractor, purifier or distillation column, may be installed prior to the condensation step so as to remove a portion of the water from the reactant stream containing the oxygenated intermediates. A separation unit may also be installed to remove specific oxygenated intermediates to allow for the production of a desired product stream containing hydrocarbons within a particular carbon range, or for use as end products or in other systems or processes.

Thus, in one embodiment, the fuel blend produced by the processes described herein is a hydrocarbon mixture that meets the requirements for jet fuel (e.g., conforms with ASTM D1655). In another embodiment, the product of the processes described herein is a hydrocarbon mixture that comprises a fuel blend meeting the requirements for a diesel fuel (e.g., conforms with ASTM D975).

Yet in another embodiment of the invention, the $C_{2+}$ olefins are produced by catalytically reacting the oxygenated intermediates in the presence of a dehydration catalyst at a dehydration temperature and dehydration pressure to produce a reaction stream comprising the $C_{2+}$ olefins. The $C_{2+}$ olefins comprise straight or branched hydrocarbons containing one or more carbon-carbon double bonds. In general, the $C_{2+}$ olefins contain from 2 to 8 carbon atoms, and more preferably from 3 to 5 carbon atoms. In one embodiment, the olefins comprise propylene, butylene, pentylene, isomers of the foregoing, and mixtures of any two or more of the foregoing. In another embodiment, the $C_{2+}$ olefins include $C_{4+}$ olefins produced by catalytically reacting a portion of the $C_{2+}$ olefins over an olefin isomerization catalyst. In an embodiment, a method of forming a fuel blend from a biomass feedstock may comprise a digester that receives a biomass feedstock and a digestive solvent operating under conditions to effectively remove nitrogen and sulfur compounds from said biomass feedstock and discharges a treated stream comprising a carbohydrate having less than 35% of the sulfur content and less than 35% of the nitrogen content of the untreated biomass feedstock on a dry mass basis; an hydrogenolysis and hydrodeoxygenation reactor comprising an hydrogenolysis and hydrodeoxygenation catalyst that receives the treated stream and discharges an oxygenated intermediate, wherein a first portion of the oxygenated intermediate stream is recycled to the digester as at least a portion of the digestive solvent; a first fuels processing reactor comprising a dehydrogenation catalyst that receives a second portion of the oxygenated intermediate stream and discharges an olefin-containing stream; and a second fuels processing reactor comprising an alkylation catalyst that receives the olefin-containing stream and discharges a liquid fuel.

The dehydration catalyst comprises a member selected from the group consisting of an acidic alumina, aluminum phosphate, silica-alumina phosphate, amorphous silica-alumina, aluminosilicate, zirconia, sulfated zirconia, tungstated zirconia, tungsten carbide, molybdenum carbide, titania, sulfated carbon, phosphated carbon, phosphated silica, phosphated alumina, acidic resin, heteropolyacid, inorganic acid, and a combination of any two or more of the foregoing. In one embodiment, the dehydration catalyst further comprises a modifier selected from the group consisting of Ce, Y, Sc, La, Li, Na, K, Rb, Cs, Mg, Ca, Sr, Ba, P, B, Bi, and a combination of any two or more of the foregoing. In another embodiment, the dehydration catalyst further comprises an oxide of an element, the element selected from the group consisting of Ti, Zr, V, Nb, Ta, Mo, Cr, W, Mn, Re, Al, Ga, In, Fe, Co, Ir, Ni, Si, Cu, Zn, Sn, Cd, P, and a combination of any two or more of the foregoing. In yet another embodiment, the dehydration catalyst further comprises a metal selected from the group consisting of Cu, Ag, Au, Pt, Ni, Fe, Co, Ru, Zn, Cd, Ga, In, Rh, Pd, Ir, Re, Mn, Cr, Mo, W, Sn, Os, an alloy of any two or more of the foregoing, and a combination of any two or more of the foregoing.

In yet another embodiment, the dehydration catalyst comprises an aluminosilicate zeolite. In one version, the dehydration catalyst further comprises a modifier selected from the group consisting of Ga, In, Zn, Fe, Mo, Ag, Au, Ni, P, Sc, Y, Ta, a lanthanide, and a combination of any two or more of the foregoing. In another version, the dehydration catalyst further comprises a metal selected from the group consisting of Cu, Ag, Au, Pt, Ni, Fe, Co, Ru, Zn, Cd, Ga, In, Rh, Pd, Ir, Re, Mn, Cr, Mo, W, Sn, Os, an alloy of any two or more of the foregoing, and a combination of any two or more of the foregoing.

In another embodiment, the dehydration catalyst comprises a bifunctional pentasil ring-containing aluminosilicate zeolite. In one version, the dehydration catalyst further comprises a modifier selected from the group consisting of Ga, In, Zn, Fe, Mo, Ag, Au, Ni, P, Sc, Y, Ta, a lanthanide, and a combination of any two or more of the foregoing. In another version, the dehydration catalyst further comprises a metal selected from the group consisting of Cu, Ag, Au, Pt, Ni, Fe, Co, Ru, Zn, Cd, Ga, In, Rh, Pd, Ir, Re, Mn, Cr, Mo, W, Sn, Os, an alloy of any two or more of the foregoing, and a combination of any two or more of the foregoing.

The dehydration reaction is conducted at a temperature and pressure where the thermodynamics are favorable. In general, the reaction may be performed in the vapor phase, liquid phase, or a combination of both. In one embodiment, the dehydration temperature is in the range of about 100° C. to 500° C., and the dehydration pressure is in the range of about 0 kPa to 6500 kPa. In another embodiment, the dehydration temperature is in the range of about 125° C. to 450° C., and the dehydration pressure is at least 15 kPa. In another version, the dehydration temperature is in the range of about 150° C. to 350° C., and the dehydration pressure is in the range of about 750 kPa to 6000 kPa. In yet another version, the dehydration temperature is in the range of about 175° C. to 325° C.

The $C_{6+}$ paraffins are produced by catalytically reacting the $C_{2+}$ olefins with a stream of $C_{4+}$ isoparaffins in the presence of an alkylation catalyst at an alkylation temperature and alkylation pressure to produce a product stream comprising $C_{6+}$ paraffins. The $C_{4+}$ isoparaffins include alkanes and cycloalkanes having 4 to 7 carbon atoms, such as isobutane, isopentane, naphthenes, and higher homologues having a tertiary carbon atom (e.g., 2-methylbutane and 2,4-dimethylpentane), isomers of the foregoing, and mixtures of any two or more of the foregoing. In one embodiment, the stream of $C_{4+}$ isoparaffins comprises of internally generated $C_{4+}$ isoparaffins, external $C_{4+}$ isoparaffins, recycled $C_{4+}$ isoparaffins, or combinations of any two or more of the foregoing.

The $C_{6+}$ paraffins will generally be branched paraffins, but may also include normal paraffins. In one version, the $C_{6+}$ paraffins comprises a member selected from the group consisting of a branched $C_{6-10}$ alkane, a branched $C_6$ alkane, a branched $C_7$ alkane, a branched $C_8$ alkane, a branched $C_9$ alkane, a branched $C_{10}$ alkane, or a mixture of any two or more of the foregoing. In one version, the C.sub.6+ paraffins comprise dimethylbutane, 2,2-dimethylbutane, 2,3-dimethylbutane, methylpentane, 2-methylpentane, 3-methylpentane, dimethylpentane, 2,3-dimethylpentane, 2,4-dimethylpentane, methylhexane, 2,3-dimethylhexane, 2,3,4-trimethylpentane, 2,2,4-trimethylpentane, 2,2,3-trimethylpentane, 2,3,3-trimethylpentane, dimethylhexane, or mixtures of any two or more of the foregoing.

The alkylation catalyst comprises a member selected from the group of sulfuric acid, hydrofluoric acid, aluminum chloride, boron trifluoride, solid phosphoric acid, chlorided alumina, acidic alumina, aluminum phosphate, silica-alumina phosphate, amorphous silica-alumina, aluminosilicate, aluminosilicate zeolite, zirconia, sulfated zirconia, tungstated zirconia, tungsten carbide, molybdenum carbide, titania, sulfated carbon, phosphated carbon, phosphated silica, phosphated alumina, acidic resin, heteropolyacid, inorganic acid, and a combination of any two or more of the foregoing. The alkylation catalyst may also include a mixture of a mineral acid with a Friedel-Crafts metal halide, such as aluminum bromide, and other proton donors.

In one embodiment, the alkylation catalyst comprises an aluminosilicate zeolite. In one version, the alkylation catalyst further comprises a modifier selected from the group consisting of Ga, In, Zn, Fe, Mo, Ag, Au, Ni, P, Sc, Y, Ta, a lanthanide, and a combination of any two or more of the foregoing. In another version, the alkylation catalyst further comprises a metal selected from the group consisting of Cu, Ag, Au, Pt, Ni, Fe, Co, Ru, Zn, Cd, Ga, In, Rh, Pd, Ir, Re, Mn, Cr, Mo, W, Sn, Os, an alloy of any two or more of the foregoing, and a combination of any two or more of the foregoing.

In another embodiment, the alkylation catalyst comprises a bifunctional pentasil ring-containing aluminosilicate zeolite.

In one version, the alkylation catalyst further comprises a modifier selected from the group consisting of Ga, In, Zn, Fe, Mo, Ag, Au, Ni, P, Sc, Y, Ta, a lanthanide, and a combination of any two or more of the foregoing. In another version, the alkylation catalyst further comprises a metal selected from the group consisting of Cu, Ag, Au, Pt, Ni, Fe, Co, Ru, Zn, Cd, Ga, In, Rh, Pd, Ir, Re, Mn, Cr, Mo, W, Sn, Os, an alloy of any two or more of the foregoing, and a combination of any two or more of the foregoing. In one version, the dehydration catalyst and the alkylation catalyst are atomically identical.

The alkylation reaction is conducted at a temperature where the thermodynamics are favorable. In general, the alkylation temperature is in the range of about −20° C. to 300° C., and the alkylation pressure is in the range of about 0 to 8000 kPa. In one version, the alkylation temperature is in the range of about 100° C. to 300° C. In another version, the alkylation temperature is in the range of about 0° C. to 100° C., and the alkylation pressure is at least 750 kPa. In yet another version, the alkylation temperature is in the range of about 0° C. to 50° C. and the alkylation pressure is less than 2500 kPa. In still yet another version, the alkylation temperature is in the range of about 70° C. to 250° C., and the alkylation pressure is in the range of about 750 kPa to 8000 kPa. In one embodiment, the alkylation catalyst comprises a mineral acid or a strong acid and the alkylation temperature is less than 100° C. In another embodiment, the alkylation catalyst comprises a zeolite and the alkylation temperature is greater than 100° C.

Another aspect of the present invention is that the $C_{4+}$ isoparaffins may be generated internally by catalytically reacting an isoparaffin feedstock stream comprising $C_{4+}$ normal paraffins, aromatics and/or naphthenes in the presence of an isomerization catalyst at an isomerization temperature and isomerization pressure to produce internally generated $C_{4+}$ isoparaffins. The $C_{4+}$ normal paraffins will generally include alkanes having 4 to 7 carbon atoms, such as n-butane, n-pentane, n-hexane, n-heptane, and mixtures of any two or more of the foregoing. In one arrangement, the isoparaffin feedstock stream is collected upstream of the alkylation catalyst from the reaction stream having the oxygenated intermediates or the reaction stream having the $C_{2+}$ olefins and processed for the production of the internally generated $C_{4+}$ isoparaffins. In another arrangement, the $C_{4+}$ normal paraffins, aromatics and/or naphthenes are collected downstream of the alkylation catalyst from the product stream having the $C_{6+}$ paraffins and then recycled for use in the production of the internally generated $C_{4+}$ isoparaffins. The $C_{4+}$ isoparaffins may also be provided solely from an external source or used to supplement the internally generated $C_{4+}$ isoparaffins. In another version, the $C_{4+}$ isoparaffins are recycled $C_{4+}$ isoparaffins collected from the product stream having the $C_{6+}$ paraffins.

The isomerization catalyst is a catalyst capable of reacting a $C_{4+}$ normal paraffin, aromatic or naphthene to produce a $C_{4+}$ isoparaffin. In one version, the isomerization catalyst includes a zeolite, zirconia, sulfated zirconia, tungstated zirconia, alumina, silica-alumina, zinc aluminate, chlorided alumina, phosphoric acid, or mixtures of any two or more of the foregoing. In another version, the isomerization catalyst is an acidic beta, mordenite, or ZSM-5 zeolite. In yet another version, the isomerization catalyst further comprises a metal selected from the group consisting of Y, Pt, Ru, Ad, Ni, Rh, Ir, Fe, Co, Os, Zn, a lanthanide, or an alloy or combination of any two or more of the foregoing. In still yet another version, the isomerization catalyst comprises a support, the support comprising alumina, sulfated oxide, silica gel, aluminum phosphate, bentonite, kaolin, magnesium silicate, magnesium carbonate, magnesium oxide, aluminum oxide, activated alumina, bauxite, silica, silica-alumina, activated carbon, pumice, zirconia, titania, zirconium, titanium, kieselguhr, or zeolites.

In an embodiment of the present invention, the fuel yield of the current process may be greater than other bio-based feedstock conversion processes. Without wishing to be limited by theory, it is believed that substantially removing nitrogen compounds and sulfur compounds from the soluble carbohydrate prior to the direct hydrogenolysis allows for a greater percentage of the biomass to be converted into higher hydrocarbons while limiting the formation of degradation products.

To facilitate a better understanding of the present invention, the following examples of certain aspects of some embodiments are given. In no way should the following examples be read to limit, or define, the entire scope of the invention.

EXAMPLES

Catalyst poisoning, biomass extraction, pretreatment, digestion and reaction studies were conducted in a Parr5000 Hastelloy multireactor comprising 6×75-milliliter reactors operated in parallel at pressures up to 14,000 kPa, and temperatures up to 275° C., stirred by magnetic stir bar. Alternate studies were conducted in 100-ml Parr4750 reactors, with mixing by top-driven stir shaft impeller, also capable of 14,000 kPa and 275° C. Larger scale extraction, pretreatment and digestion tests were conducted in a 1-Liter Parr reactor with annular basket housing biomass feed, or with filtered dip tube for direct contacting of biomass slurries.

Reaction samples were analyzed for sugar, polyol, and organic acids using an HPLC method entailing a Bio-Rad Aminex HPX-87H column (300 mm×7.8 mm) operated at 0.6 ml/minute of a mobile phase of 5 mM sulfuric acid in water, at an oven temperature of 30° C., a run time of 70 minutes, and both RI and UV (320 nm) detectors.

Product formation (mono-oxygenates, diols, alkanes, acids) were monitored via a gas chromatographic (GC) method "DB5-ox", entailing a 60-m×0.32 mm ID DB-5 column of 1 um thickness, with 50:1 split ratio, 2 ml/min helium flow, and column oven at 40° C. for 8 minutes, followed by ramp to 285° C. at 10° C./min, and a hold time of 53.5 minutes. Injector temperature was set at 250° C., and detector temperature at 300° C.

Gasoline production potential by condensation reaction was assessed via injection of one microliter of liquid intermediate product into a catalytic pulse microreactor entailing a GC insert packed with 0.12 grams of ZSM-5 catalyst, held at 375° C., followed by Restek Rtx-1701 (60-m) and DB-5 (60-m) capillary GC columns in series (120-m total length, 0.32 mm ID, 0.25 um film thickness) for an Agilent/HP 6890 GC equipped with flame ionization detector. Helium flow was 2.0 ml/min (constant flow mode), with a 10:1 split ratio. Oven temperature was held at 35° C. for 10 minutes, followed by a ramp to 270° C. at 3° C./min, followed by a 1.67 minute hold time. Detector temperature was 300° C.

Example 1

Hydrogenolysis Catalyst Poisoning by N,S Amino Acid

Two Parr5000 reactors were charged with 20 grams of a mixture of 50% glycerol in deionized water, and 0.35 grams of 1.9% Pt—Re/zirconia catalyst reduced at 400° C. under hydrogen. Glycerol is one of the intermediates derived from monosaccharides or sugar alcohols in the hydrogenolysis or hydrodeoxygenation reaction sequence, and can react to form monooxygenate intermediates such as acetone, 2-propanol, and ethanol. It therefore represents a model component for the study of hydrogenolysis and hydrodeoxygenation.

0.03 grams of the N,S amino acid cysteine were added to reactor B, but not to A. Reactors were pressured with 3500 kPa of $H_2$, and heated to 255° C. for 6.5 hours under conditions corresponding to hydrogenolysis (HG) and hydrodeoxygenation, before cooling for GC analysis of products. Results indicated 84.7% conversion of glycerol to mono oxygenate and other expected products for reactor A, but only 57.6% conversion for reactor B. Calculated first order rate constants, per weight fraction of catalyst, were 16.5/h/wt-cat for A, vs. 7.5/h/wt-cat for B. The addition of 1500 ppm cysteine was observed to decrease the apparent activity for conversion of glycerol via HG or HDO, by a factor of more then two.

A third reaction C was conducted under identical conditions, except with 1500 ppm alanine (N-only amino acid), and exhibited an apparent rate constant of 14/h/wt-cat, or an approximate 12% reduction in activity.

These results indicate substantial poisoning by cysteine (N,S-amino acid), and moderate poisoning by alanine (N-only amino acid), for the Re-promoted Pt catalyst which can be employed in hydrogenolysis and hydrogenolysis reactions, via addition of external hydrogen at the start of the reaction sequence.

Example 2

Poisoning of Pt/Alumina Catalyst by N,S and N-Only Amino Acid

The experiment of Example 1 was repeated with 5% Pt/alumina catalyst Escat 2941 (Strem Chemicals). In addition to reactors A (no amino acid) and B (1500 ppm cysteine), a third reactor C was charged with 1500 ppm of alanine, a N-only amino acid. Measured conversions were 56.7%, 42.3%, and 45.4% for reactors A through C, corresponding to apparent first order rate constants of 10.2, 3.0, and 3.2/h/wt-cat. Addition of 1500 ppm of either N,S or N-only amino acid was observed to decrease glycerol hydrogenolysis or hydrooxygenation rates by more than a factor of 3, for the unpromoted Pt/alumina catalyst.

Example 3

Poisoning of Ru Catalyst Under Hydrogenolysis or Hydrodeoxygenation Conditions

Examples 1A and B were repeated with 5% Ru/C Escat 4401 catalyst (Strem Chemicals, 50% wet), with an initial charge of 6000 kPa $H_2$. Conversion for reactor A (no amino acid) was 56.5%, while conversion for reactor B (1500 ppm cysteine) was only 9%. Apparent first order rate constant for B (1500 ppm cysteine) was only 1.7/h/wt-cat, vs. a rate constant of reactor A of 14.7/h/wt-cat. This result indicates poisoning by amino acid of a Ru-based catalyst, in testing conducted under hydrogenolysis or hydrogenolysis conditions.

Example 4

Poisoning of Glycerol Hydrogenolysis/HDO

For examples 4A through 4C, the experiment of Example 1 was repeated with a Re-modified 1.9% Pt/zirconia catalyst calcined at 400° C. after impregnation, and then reduced at 400° C. under hydrogen. The reaction was conducted with an initial pressure of 5000 kPa $H_2$. Reactor A (no poison) indicated a first-order rate constant of 53.9/h/wt-cat, while Reactor B with 1500 ppm cysteine (N,S amino acid) gave lower conversions corresponding to a rate of only 4.8/h/wt-cat. Reactor C with 1500 ppm alanine (N-only amino acid) showed moderate activity, corresponding to a rate of 20.2/h/wt-catalyst. This experiment shows substantial poisoning by N,S amino acid cysteine, and moderate poisoning by N-only amino acid alanine, for hydrogenolysis/hydrodeoxygenation experiments conducted with glycerol as feed.

Example 5

N,S- and N Poisoning of Pt/C Catalyst Used for Sorbitol Hydrogenolysis and Hydrodeoxygenation An experiment was conducted in the Parr5000 multireactor using 0.5 grams of 5% Pt/C as catalyst (50% wet), and 40 grams of 50% sorbitol as feed, for 3 hours at 250° C., with an initial gas feed of 3500 kPa $H_2$. Final liquids were analyzed for remaining unconverted sorbitol content by HPLC analysis. Conversion of reactor A (no amino acid) corresponded to an apparent first order rate constant of 28.8/h/wt-cat, while reactor B (3000 ppm cysteine) exhibited an apparent rate of only 2.8/h/wt-cat. Reactor C (2250 ppm alanine) exhibited an apparent first order rate constant for sorbitol conversion of 6.0/h/wt-cat.

Yield of ethylene glycol, 1,2-propylene glycol, ethanol, and isopropanol for Reactor C demonstrated some hydrogenolyisis and hydro-deoxygenation activity persisted in the presence of alanine. Yields of these species were undetectable for the case of cysteine addition. These results indicate poisoning of sorbitol hydrogenolysis and hydrodeoxygenation activity is particularly severe for the Pt/C catalyst with added N,S amino acid.

Example 6

Extraction of Biomass

For Example 6, Parr5000 reactors A-C were loaded with 2.1 grams of softwood (pine) chips, comprising 2 whole chips of approximate 1-inch×1-inch×3 mm size, trimmed to fit the reactor body, and 20 grams of a solvent mixture of 25% by weight acetone, 25% isopropanol, and 2% acetic acid in deionized water, designated as "A"-solvent. Reactors D-F were loaded with the same amount of pine chips, and deionized water only. The reactors were heated overnight under nitrogen, at temperatures of 170, 190, and 210° C. for reactors A, B, and C, respectively, and for reactors D, E, F, respectively (Table 1).

Partially digested whole chips were carefully removed to Petri dish for vacuum drying overnight at 90° C. to assess undigested dry solids. Fine solids were washed into a filter funnel with Whatman GF/F filter paper, which was also vacuum dried overnight at 90° C. to assess the residual fines solids which precipitated after cooling of the reactors to ambient temperature. Mass loss from the whole chips was recorded as percent digested at the extraction temperature. This amount was corrected by the mass of fines redeposited upon cool down to 25° C., and recorded as the "% dissolved at 25° C.".

Samples of liquid were analyzed for nitrogen by elemental X-ray analysis.

TABLE 1

Extraction and Pre-treatment by solvent leaching

| Sx | solvent | T ° C. | Liquid/ dry wood | Chips % digest | Dissolved % @ 25° C. | N leached ppm-dry wood |
|---|---|---|---|---|---|---|
| A | A-solv | 170 | 11.896 | 38.4% | 34.1% | 416 |
| B | A-solv | 190 | 11.925 | 52.4% | 45.9% | 405 |
| C | A-solv | 210 | 12.138 | 100.0% | 66.5% | 449 |
| D | DIWater | 170 | 11.930 | 29.0% | 24.2% | 143 |
| E | DIWater | 190 | 12.756 | 33.7% | 27.5% | 268 |
| F | DIWater | 210 | 11.106 | 61.6% | 45.7% | n.a. |

As shown in Table 1, extraction and dissolution of biomass was enhanced by the use of water-soluble oxygenated organic solvent in deionized water, over deionized water. The extent of extraction and digestion was also increased by an increase in temperature, with complete digestion of wood chips at 210° C. in A-solvent. A-solvent also increased the extraction of nitrogen, presumed from proteins and amino acids in the wood matrix, where nitrogen observed in the liquid extract is expressed relative to the mass of dry wood extracted. Sulfur analyses were low, at detection limits for these samples.

This example demonstrates the use of oxygenated solvent, selected from components produced in situ via hydrogenolysis or hydrodeoxygenation of bio-based feed materials in water, to facilitate extraction and solubiliztion of a portion of a biomass sample, including N-containing components attributed to the presence of amino acids and proteins. The extract can be used to produce biofuels by hydrogenolysis or hydrogenolysis, with optimal removal of the N-containing species to protect catalyst life. Use of oxygenated organic solvent enabled more extensive extraction to occur at lower temperature, where heavy ends formation may be minimized. A residual pretreated solid pulp is also produced, which may be used for other applications.

Example 7

Biomass Extraction and Reprecipitation in Water and Oxygenated Solvents

A series of experiments were conducted in a 100-ml Parr reactor fitted with 0.5 micron stainless steel filtered dip tube. Extraction of southern hardwood was examined, with removal of samples via filtered via dip tube at 210° C. temperature (17 hours), to compare the % precipitated solids in the sample after cooling to ambient temperature (nominal 25° C.), with the % solids in the final mixture recovered from the reactor as determined via cold filtration. The fraction of biomass extracted and digested was also assessed, by GC analysis of the intermediates formed. In addition to testing of "A-solvent" and deionized water, 50% ethanol in water, and "B-solvent" entailing 20 wt % ethylene glycol, 20% wt % 1,2-propylene glycol, and 2% acetic acid in deionized water, were also examined. "B-solvent" represents diol intermediates formed in the hydrogenolysis/hydrodeoxygenation reaction. Assessment of the percent digestion of initial dry wood was again made by recovering the undigested solids by filtration on Whatman GF/F filter paper, and drying overnight in a vacuum oven at 90° C.

Results (Table 2) show all solvents can digest a portion of the wood sample at 210° C. A-solvent (25% acetone, 25% isopropanol, and 2% acetic acid) gave the best digestion, or dissolution of biomass. Addition of oxygenate solvent including those components formed during hydrogenolysis or hydrodeoxygenation of bio-based feeds, was observed to improve the retention of dissolved biomass components in solution upon cooling to ambient temperature. Presence of lignin in precipitating samples was confirmed by UV-vis analysis in the region of 190-400 nm. While water-only solvent gave good extraction results at the 210° C. extraction temperature, a substantial portion precipitated upon cooling to 25° C.

TABLE 2

Solvent extraction and re-precipitation of biomass as assessed by hot (210° C.) vs ambient (25° C.) filtration

| | Solvent | initial wood | 25° C. % digest | 210° C. % digest |
|---|---|---|---|---|
| A | A Solvent | 5.43% | 72.19% | 73.84% |
| B | B solvent | 5.80% | 41.57% | 28.92% |
| C | 50% EtOH | 5.42% | 54.24% | 42.32% |
| D | DI water | 5.32% | 29.10% | 69.33% |

Example 8

Removal of N,S Amino Acid Cysteine by Ion Exchange

A solution of 0.5 wt % N,S amino acid cysteine in deionized water was prepared, with and without addition of 0.5 wt % acetic acid. 7 grams of solution were contacted with between 0.02 and 0.26 grams of ion exchange resins Amberlyst A-21 dimethyamino weak base resin, and Amberlyst A-15 strong sulfonic acid resin (Rohm and Haas). Resins were shaken overnight at 25° C., and sampled for x-ray analysis of remaining nitrogen. The amount of N exchanged on the resin was calculated from the loss of nitrogen from the liquid, and the known ratio of resin to liquid charged. Results (Table 3) show strong adsorption or exchange of cysteine amino acid by both resins, as evidenced by a separation factor "SF" calculated as the ratio of N adsorbed on the resin, to N remaining in solution. Observation of a separation factor SF which increases as the amount of N remaining in solution decreases, indicates strong sorption and ion exchange, such that a fixed-bed ion exchange contactor can be designed to effect complete removal of N.

The amino acid cysteine was the only source of N for these experiments, and contains a sulfur (S) atom for every nitrogen (N) atom present. Measurement of removal of nitrogen N thus also indicates removal of an equivalent fraction of sulfur S, for these experiments. The experiments show the ability of acidic or basic ion exchange resins to remove amino acids from aqueous solution under appropriate conditions.

TABLE 3

Removal of cysteine by ion exchange

| Resin | acetic acid | Final Liquid ppm-N | Final Resin- ppm N | SF |
|---|---|---|---|---|
| A-21 weak base | 0.50% | 163 | 51471 | 316 |
| A-21 weak base | 0.50% | 88 | 41176 | 468 |
| A-21 weak base | 0.50% | 37 | 27861 | 753 |
| A-21 weak base | 0.50% | 11 | 12666 | 1151 |
| A-15 strong acid | 0% | 152 | 44825 | 295 |
| A-15 strong acid | 0% | 86 | 38611 | 449 |
| A-15 strong acid | 0% | 33 | 26047 | 789 |
| A-15 strong acid | 0% | 9 | 11776 | 1308 |

Example 9

Mixed Bed Removal of N,S Amino Acid

A sample of Brazilian cane juice concentrate containing dissolved proteins and amino acids was diluted 50% with deionized water, and the resulting 50% cane juice mixture was mixed with varying fractions of deionized water to prepare a series of dilutions, before contacting 10-g of total liquid with a nominal 0.5 grams of Amberlite MB-20 mixed bed strong acid and base ion exchange resin. The liquid and resin mixture was equilibrated by shaking overnight at 25° C., followed by sampling for x-ray analysis of residual nitrogen and sulfur. A separation factor SF was again calculated, as the ppm of N or S sorbed in the resin, divided by the ppm of N or S remaining in the liquid solution. Separation factors which increased as the final solution concentration of N and S decreased were again observed, indicating strong sorption and ion exchange (Table 4). This result indicates a mixed bed ion exchange resin such as MB-20 can be effective in removal of N,S compounds present in an aqueous solution of a natural sugar-based feedstock.

TABLE 4

Removal of N, S impurities in cane juice by mixed bed ion exchange

| Sx | Resin-g | 50% cane-g | DIW-g | final N (ppm-L) | final S (ppm-L) | SF-N | SF-S |
|---|---|---|---|---|---|---|---|
| feed | 0.00 | 10.00 | 0.00 | 374.0 | 388.5 | N/A | N/A |
| A | 0.54 | 10.33 | 0.00 | 273.0 | 110.0 | 8.3 | 52.9 |
| B | 0.55 | 5.06 | 5.03 | 103.0 | 16.0 | 16.7 | 225.5 |
| C | 0.56 | 1.02 | 9.01 | 2.0 | 1.0 | 360.7 | 771.0 |
| D | 0.53 | 0.30 | 9.70 | 0.1 | 0.1 | 2234.5 | 2321.9 |

Example 10

Ion Exchange Treatment of Solvent and Water Extract

"A-solvent" (190° C.) and deionized (DI) water (170° C.) extraction liquids from the extraction of soft (pine) wood in Example 6, were contacted by shaking overnight at 25° C., with Amberlite MB-20 monobed resin at a liquid/dry resin ratio of 21-24. X-ray analysis of final liquid indicated removal of a substantial portion of the N impurities leached from the softwood sample, in a single contacting (Table 5). This result demonstrates the use of a mixed or monobed of strong acid and base resin (MB-20) to remove the specific N compounds found in extracts from soft wood samples, in the presence of water or aqueous oxygenated solvents. Sulfur S was below detection limit in these samples.

TABLE 5

Purification of softwood (pine) extracts by mixed bed ion exchange

| # | Liquid | Liq/dry-resin | feed liquid N-ppm | Final liquid N-ppm | Resin N-ppm |
|---|---|---|---|---|---|
| B | A-solv extract 190° C. | 21 | 34 | 11 | 486 |
| D | DI water extract 170° C. | 24 | 12 | 3 | 218 |

Example 11

Short Contact Time Extraction with Oxygenated Solvent and Water

For Example 11A, 42.25-grams of an A-solvent mixture (25% acetone, 25% isopropanol, 2% acetic acid in water) were contacted with 4.308 grams of southern hardwood for 5 hours at 170° C., followed by cooling to room temperature for recovery of undigested solids by filtration (Whatman GF/F). Separated liquor was black, indicating removal of color bodies. The recovered solid pulp was water washed to remove residual solvent. A portion was dried overnight in a vacuum oven at 90° C., to assess dry solids content of the recovered pulp. Results indicate extraction of 47.5% of the original softwood, on a dry mass basis, using a contact time of 5 hours. X-ray analysis indicated removal of 860 ppm nitrogen basis the mass of dry wood charged, using the extractive solvent pretreatment. Sulfur was below detection in this sample.

In example 11B, extraction was examined with series of consecutive experiments conducted with 22.4 grams of softwood (pine) and 500-grams deionized water in the 1-Liter stirred reactor with filtered dip tube, and sampling for total organic carbon analysis versus time. The leaching studies conducted overnight at 170, 190, and 210° C. A maximum in the TOC content was obtained after only 2 hours at 170° C., where 73% of the final leached carbon was obtained. Further increase to 210° C. before removal of liquid by hot filtration, resulted in 65% digestion of the initially charged biomass, as determined by filtration (Whatman GF/F) of solids remaining in the reactor after cooling.

These results indicate an ability to pretreat and extract biomass samples with water or oxygenated organic solvents, with a contact time as low as 2-5 hours. Up to 65% of the nitrogen present in the biomass was also extracted in a single stage of extraction, such that removal of nitrogen and sulfur compounds, if present, is required to protect catalysts sensitive to these components, and used for further processing of the extract.

Example 12

Reaction of Water and Solvent Extracted Softwood

Softwood (pine) was extracted first with deionized water at 170° C., then with A-solvent (25% acetone, 25% isopropanol, 2% acetic acid by weight in deionized water) at 190° C., then washed with deionized water in a filter funnel. 0.946 grams of the resulting pretreated pulp were added with 20.3 grams of deionized water, 0.451 grams of 5% Ru/C Escat 4401 catalyst (Strem Chemicals, 50% wet), and 6000 kPa H2 to a Parr 5000 reactor, and heated to 240° C. for 18 hours. Reactor contents were filtered (Whatman GF/F filter paper) to recover undigested solids, analyzed by vacuum drying at 90 C overnight. Results indicated 74.7% digestion of solids. Liquid product was injected onto the ZSM-5 pulse microreactor, to assess yield of gasoline components alkanes, benzene, toluene, xylenes, trimethlybenzenes, and naphthalenes, relative to that which would be obtained for a model hydrogenolysis (HG)/hydrodeoxygenation (HDO) reaction from complete conversion of the carbon contained in the biomass charged to model compound isopropanol. A yield of gasoline-range products of greater than 29%, was indicated, relative to yields of 27% observed with whole, untreated softwood (pine) fed directly to a companion reactor operated under identical conditions. Nitrogen and sulfur analysis by x-ray indicated only 10 ppm N and undetectable sulfur in the liquid reaction product. This represented a 76% reduction in N per dry mass of biomass (softwood) charged, relative to the untreated fresh softwood sample.

This result shows that the sequence of water extraction to remove extractable carbohydrates (which were reacted in a separate experiment to form additional intermediates for condensation to gasoline-range fuels), with mixed bed ion exchange to remove N,S impurities from the extract, followed by solvent extraction to remove N,S impurities from the digested biomass pulp, followed by direct digestion and reaction of the pretreated pulp solids under hydrogenolysis/hydrodeoxygenation conditions, can yield the desired intermediates for either condensation to gasoline range products over an acid catalyst, or alternately oligomerization to jet-diesel range products via dehydration and oligomerization. Use of water and solvent extraction produces a treated pulp that is reduced in N species, thereby reducing the concentration of know catalyst poisons, relative to untreated pulp.

Example 13

Combined Hydrogenolysis of Ion Exchanged Extract and Water-Treated Pulp 3.519 grams of softwood were treated with 20.157 grams of deionized water for 18 hours at 170° C. Extract liquid was separated from undigested pulp via filtration with Whatman GF/F paper in a filter funnel. Recovery of pretreated pulp was assessed by vacuum drying a solids sample overnight at 90° C., which indicated extraction of 24% of the initial hardwood (dry mass basis) as a yellow extract.

The liquid extract from Example 7D entailing water extraction of hardwood at 210° C., was treated overnight at 20:1 ratio with Amberlite monobed MB-20 strong acid and base resin, to remove nitrogen and sulfur impurities. 8.060 grams of the ion exchanged extract were combined in a Parr5000 reactor with 1.002 grams of the pretreated pulp from step 1, along with 12.06 grams of deionized water, 0.429 grams of 5% Ru/C catalyst Escat 4401 (50% wet, Strem Chemicals), and 3500 kPa of H2. The mixture was heated from 170-240° C. over 5 hours, before reaction at 240° C. overnight to complete an 18-hour cycle.

53% of the pretreated pulp was digested via reaction at a final pH of 3.2, with DB5-ox analysis confirming the presence of mono-oxygenate intermediate products of retention time less than sorbitol. X-ray analysis indicated nitrogen at only 453 ppm relative to the mass of softwood charged, which compares with 1100-1500 ppm expected for this sample.

This example demonstrates hydrogenolysis or hydrodeoxygenation under conditions where all hydrogen was supplied externally, for a combined ion-exchange extract of softwood, with a pre-treated softwood pulp.

Example 14

Combined Hydrogenolysis of Ion Exchange-Treated Extract and Solvent-Extracted Pulp 2.105 grams of southern hardwood were charged to a Parr5000 reactor with 20.31 grams of A-solvent (25% by weight isopropanol, 25% acetone, and 2% acetic acid in deionized water) and 4100 kPa of $N_2$, before heating for 5 hours at 170° C. Extract liquid was separated from undigested pulp via filtration with Whatman GF/F paper in a filter funnel. 16.92 grams of the extract liquid were contacted with Amberlite MB-20 monobed resin for 1 hour, followed by separation of resin by filtration.

To a Parr5000 reactor, 8.078 grams of the ion-exchange treated extract were added back to 1.388 grams of the solid pulp from step 1, containing an estimated 0.2 grams of residual A-solvent. 11.90 grams of DI water were added, along with 0.51 grams of 5% Ru/C Escat 4401 catalyst (Strem Chemicals, 50% wet). After addition of 6000 kPa of H2, temperature was ramped from 170-240° C. over 5 hours, followed by overnight reaction at 240° C. to complete an 18 hour cycle.

Filtration (Whatman GF/F) to recover residual catalyst and undissolved pulp, and vacuum drying at 90° C. revealed essentially complete conversion of all pulp. GC analysis via the DB %-ox method indicated 35% yields of the expected monooxygenate intermediates, relative to the original southern hardwood charged, and formation of byproduct C1-C3 bio-gas stream to a comprise an total estimated 55% yield of liquid fuels and biogas, not including the formation of additional isopropanol solvent.

This example demonstrates the ability to extract a biomass sample, ion exchange the extract to remove N,S impurities, and combine with extracted solids pulp to produce biofuels and biogas with yields in excess of 50%, relative to maximum yield of approximately 70% corresponding to the fraction of hydrolyzable carbohydrates in the original sample. Byproduct CO2 formation corresponded to a yield loss of only 1.1% of feed, relative to a companion experiment started with a low partial pressure of H2 with 5% Pt/alumina catalyst underpartial aqueous phase reforming conditions (insufficient hydrogen added to complete the conversion without additional H2 generation by APR), which gave 7.1% yield loss of biomass feed to CO2.

Example 15

Biomass Digestion and Reaction with Recycle Oxygenated Intermediates as Solvent

A flow reactor was operated with 1.07 grams of Re-promoted 1.9% Pt/zirconia catalyst at 270° C., and a weight hourly space velocity of 0.96/hr feed of 50 wt % sorbitol in deionized water. 10 ml/min hydrogen (measured at 25° C. and atmospheric pressure) was cofed to the reactor, operated in trickle bed mode at 7000 kPa total pressure. Conversion of sorbitol to intermediate products via hydrogenolysis and hydrodeoxygenation reactions was greater than 99%. The intermediate products stream exhibited a pH of 2.79.

19.87 grams of the intermediate product stream were charged to a Parr5000 reactor together with 1.82 grams (dry basis) of hardwood, 0.35 grams of Re-promoted 1.9% Pt/zirconia catalyst, and 5300 kPa of H2. The reactor was rampled from 170-210° C. over 5 hours, before continuing at 210° C. to complete an 18-hour reaction cycle. Undigested solids were assessed via filtration (Whatman GF/F filter), and drying overnight in a vacuum oven at 90° C. Results of the concerted digestion and hydrogenolysis reaction indicated 88% digestion of solids, with formation of new mono-oxygenates and diols with retention time less than sorbitol feed.

This example demonstrates the concept of direct use of recycled oxygenated intermediates from a hydrogenolysis or hydrodeoxygenation reaction, as solvent for digestion and reaction of biomass, in a hydrogenolysis or hydrodeoxygenation process.

What is claimed is:
1. A method comprising:
   (i) providing a biomass containing celluloses, hemicelluloses and lignin;
   (ii) contacting the biomass with an aqueous media to form a extracted biomass comprising celluloses, hemicelluloses, soluble carbohydrates and lignin;
   (iii) separating at least a portion of an aqueous liquor from the extracted biomass thereby providing the aqueous liquor stream comprising soluble carbohydrates and a pretreated biomass solids stream comprising celluloses, hemicelluloses, and lignin;

(iv) contacting said extracted biomass solids stream with a first digestive solvent to form a pretreated biomass comprising celluloses, residual hemicelluloses and lignin;

(v) contacting said pretreated biomass with a second digestive solvent to form a solubilized pulp comprising soluble carbohydrates;

(vi) contacting the aqueous liquor stream with a purification substrate effective to remove sulfur compounds and nitrogen compounds thereby producing a treated carbohydrate stream having less than 35% of the sulfur content and less than 35% of the nitrogen content based on the untreated aqueous liquor stream;

(vii) contacting the treated carbohydrate stream and the solubilized pulp stream directly with hydrogen in the presence of a hydrogenolysis catalyst to form a plurality of oxygenated intermediates wherein a first portion of the oxygenated intermediates are recycled to form the second digestive solvent; and (viii) processing at least a second portion of the oxygenated intermediates to form a liquid fuel.

2. The method of claim 1 wherein the purification substrate is selected from the group consisting of activated carbons, aluminas, silicas, silica-aluminas, clay minerals, diatomatious earth, zirconia, titania, polymeric adsorbents, and ion-exchange resins.

3. The method of claim 2 wherein the purification substrate is an ion exchange resin.

4. The method of claim 1 wherein the oxygenated intermediates is subjected to condensation to produce a liquid fuel.

5. The method of claim 1 wherein the oxygenated intermediates is subjected to dehydration and alkylation to produce a liquid fuel.

6. A method comprising:

(i) providing a biomass containing celluloses, hemicelluloses and lignin;

(ii) contacting the biomass with an aqueous media to form an extracted biomass comprising celluloses, hemicelluloses, soluble carbohydrates and lignin;

(iii) separating at least a portion of an aqueous liquor from the extracted biomass thereby providing the aqueous liquor stream comprising soluble carbohydrates and a pretreated biomass solids stream comprising celluloses, hemicelluloses, and lignin;

(iv) contacting said extracted biomass solids stream with a first digestive solvent to form a pretreated biomass comprising celluloses, and residual hemicelluloses and lignin;

(v) contacting said pretreated biomass with a second digestive solvent to form a solubilized pulp comprising soluble carbohydrates wherein at least a portion of the solubilized pulp is provided to the aqueous liquor stream;

(vi) contacting the aqueous liquor stream with a purification substrate effective to remove sulfur compounds and nitrogen compounds thereby producing a treated carbohydrate stream having less than 35% of the sulfur content and less than 35% nitrogen content based on the untreated aqueous liquor stream;

(vii) contacting the treated carbohydrate stream directly with hydrogen in the presence of a hydrogenolysis catalyst to form a plurality of oxygenated intermediates wherein a first portion of the oxygenated intermediates are recycled to form the second digestive solvent; and (viii) processing at least a second portion of the oxygenated intermediates to form a liquid fuel.

7. The method of claim 6 wherein the purification substrate is selected from the group consisting of activated carbons, aluminas, silicas, silica-aluminas, clay minerals, diatomatious earth, zirconia, titania, polymeric adsorbents, and ion-exchange resins.

8. The method of claim 7 wherein the purification substrate is an ion exchange resin.

9. The method of claim 6 wherein the oxygenated intermediates is subjected to condensation to produce a liquid fuel.

10. The method of claim 6 wherein the oxygenated intermediates is subjected to dehydration and alkylation to produce a liquid fuel.

11. The method of claim 1 wherein the pretreated biomass and the second digestive solvent is operated counter-currently and the countercurrent solvent is provided to the aqueous medium counter-currently to the biomass stream.

12. A method comprising (i) providing a biomass containing celluloses, hemicelluloses and lignin; (ii) contacting the biomass with an aqueous media to form a extracted biomass comprising celluloses, hemicelluloses, soluble carbohydrates and lignin; (iii) separating at least a portion of an aqueous liquor from the extracted biomass thereby providing the aqueous liquor stream comprising soluble carbohydrates, and a extracted biomass solids stream comprising celluloses, hemicelluloses, and lignin; (iv) contacting said extracted biomass solids stream with a first digestive solvent to form a pretreated biomass comprising celluloses, and residual hemicelluloses; (v) contacting said pretreated biomass with a second digestive solvent to form a solubilized pulp comprising soluble carbohydrates wherein at least a portion of the solubilized pulp is provided to the aqueous media; (vi) contacting the aqueous liquor stream with a purification substrate effective to remove sulfur compounds and nitrogen compounds thereby producing a treated carbohydrate stream having less than 35% of the sulfur content and less than 35% of the nitrogen content, based on untreated aqueous liquor stream thereby producing a treated aqueous liquor carbohydrate stream; (vii) contacting the treated carbohydrate stream directly with hydrogen in the presence of a hydrogenolysis catalyst to form a plurality of oxygenated intermediates wherein the a first portion of the oxygenated intermediates are recycled to form the second digestive solvent; and (viii) processing at least a second portion of the oxygenated intermediates to form a liquid fuel.

13. The method of claim 12 wherein the purification substrate is selected from the group consisting of activated carbons, aluminas, silicas, silica-aluminas, clay minerals, diatomatious earth, zirconia, titania, polymeric adsorbents, and ion-exchange resins.

14. The method of claim 13 wherein the purification substrate is an ion exchange resin.

15. The method of claim 12 wherein the oxygenated intermediates is subjected to condensation to produce a liquid fuel.

16. The method of claim 12 wherein the oxygenated intermediates is subjected to dehydration and alkylation to produce a liquid fuel.

17. A system comprising: a system comprises: a vessel that receives a biomass feedstock and an aqueous media operating under conditions effective to produce a extracted biomass comprising celluloses, hemicelluloses, soluble carbohydrates and lignin and discharges an aqueous liquor stream comprising soluble carbohydrates; a digester that receives the extracted biomass and a first digestive solvent operating under conditions effective to produce a pretreated biomass comprising celluloses, and residual hemicelluloses and lignin; a vessel that receives the pretreated biomass and a second digestive solvent operating under conditions effective to produce a solubilized pulp comprising soluble carbohydrates; an aqueous liquor treater comprising a purification substrate that receives the aqueous liquor and discharges a treated carbohydrate stream having less than 35% of the sulfur content and less than 35% of the nitrogen content, based on the untreated aqueous liquor stream; a hydrogenolysis reactor comprising a hydrogenolysis catalyst that receives hydrogen and the treated carbohydrate stream and the solubilized pulp and discharges an oxygenated intermediate stream, wherein a first portion of the oxygenated intermediate stream is recycled as the second digestive solvent to the vessel that receives the pretreated biomass to form the solubilized pulp; a first fuels processing reactor comprising a dehydrogenation catalyst that receives a second portion of the oxygenated intermediate stream and discharges an olefin-containing stream; and a second fuels processing reactor comprising an alkylation catalyst that receives the olefin-containing stream and discharges a liquid fuel.

18. A system comprising: a vessel that receives a biomass feedstock and an aqueous media operating under conditions effective to produce a extracted biomass comprising celluloses, hemicelluloses, soluble carbohydrates and lignin and discharges an aqueous liquor stream comprising soluble carbohydrates; a digester that receives the extracted biomass and a first digestive solvent operating under conditions effective to produce a pretreated biomass comprising celluloses, residual hemicelluloses and lignin; a vessel that receives the pretreated biomass and a second digestive solvent operating under conditions effective to produce a solubilized pulp comprising soluble carbohydrates; an aqueous liquor treater comprising a purification substrate that receives the aqueous liquor and the solubilized pulp and discharges a treated carbohydrate stream having less than 35% of the sulfur content and less than 35% of the nitrogen content based on the untreated aqueous liquor stream; a hydrogenolysis reactor comprising a hydrogenolysis catalyst that receives hydrogen and the treated carbohydrate stream and discharges an oxygenated intermediate stream, wherein a first portion of the oxygenated intermediate stream is recycled to the vessel that receives the pretreated biomass to form the solubilized pulp; and a fuels processing reactor comprising a condensation catalyst that receives a second portion of the oxygenated intermediate stream and discharges a liquid fuel.

19. A system comprising: a vessel that receives a biomass feedstock and an aqueous media operating under conditions effective to produce a extracted biomass comprising celluloses, hemicelluloses, soluble carbohydrates and lignin and discharges an aqueous liquor stream comprising soluble carbohydrates; a digester that receives the extracted biomass and a first digestive solvent operating under conditions effective to produce a pretreated biomass comprising celluloses, residual hemicelluloses and lignin; a vessel that receives the pretreated biomass and a second digestive solvent operating under conditions effective to produce a solubilized pulp comprising soluble carbohydrates; an aqueous liquor treater comprising a purification substrate that receives the aqueous liquor and discharges a treated aqueous liquor carbohydrate stream having less than 35% of the sulfur content and less than 35% of the nitrogen content based on the untreated aqueous liquor stream; a hydrogenolysis reactor comprising a hydrogenolysis catalyst that receives hydrogen and the treated aqueous liquor carbohydrate stream and discharges an oxygenated intermediate stream, wherein a first portion of the oxygenated intermediate stream is recycled as the second digestive solvent to the vessel that receives the pretreated biomass to form the solubilized pulp; and at least a portion of the solubilized pulp is recycled to the vessel that receives the biomass feedstock to comprise at least a portion of the aqueous media, and a fuels processing reactor comprising a condensation catalyst that receives a second portion of the oxygenated intermediate stream and discharges a liquid fuel.

20. A system comprising: a vessel that receives a biomass feedstock and an aqueous media operating under conditions effective to produce a extracted biomass comprising celluloses, hemicelluloses, soluble carbohydrates and lignin and discharges an aqueous liquor stream comprising soluble carbohydrates; a digester that receives the extracted biomass and a first digestive solvent operating under conditions effective to produce a pretreated biomass comprising celluloses, residual hemicelluloses and lignin; a vessel that receives the pretreated biomass and a second digestive solvent operating under conditions effective to produce a solubilized pulp comprising soluble carbohydrates; an aqueous liquor treater comprising a purification substrate that receives the aqueous liquor and discharges a treated aqueous liquor carbohydrate stream having less than 35% of the sulfur content and less than 35% of the nitrogen content based on the untreated aqueous liquor stream; a hydrogenolysis reactor comprising a hydrogenolysis catalyst that receives hydrogen and the treated aqueous liquor carbohydrate stream and discharges an oxygenated intermediate stream, wherein a first portion of the oxygenated intermediate stream is recycled as the second digestive solvent to the vessel that receives the pretreated biomass to form the solubilized pulp; and at least a portion of the solubilized pulp is recycled to the vessel that receives the biomass feedstock to comprise at least a portion of the aqueous media; a first fuels processing reactor comprising a dehydrogenation catalyst that receives a second portion of the oxygenated intermediate stream and discharges an olefin-containing stream; and a second fuels processing reactor comprising an alkylation catalyst that receives the olefin-containing stream and discharges a liquid fuel.

* * * * *